US012579901B2

(12) United States Patent
Dhulipudi et al.

(10) Patent No.: US 12,579,901 B2
(45) Date of Patent: Mar. 17, 2026

(54) SYSTEMS AND METHODS FOR DETERMINING INTERSECTION THREAT INDICES

(71) Applicant: Honeywell International Inc., Charlotte, NC (US)

(72) Inventors: Durga Prasad Dhulipudi, Hyderabad (IN); Venkatrangarao Ramaraju, Hyderabad (IN); Naveen Bansal, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 71 days.

(21) Appl. No.: 18/605,116

(22) Filed: Mar. 14, 2024

(65) Prior Publication Data

US 2025/0232685 A1 Jul. 17, 2025

(30) Foreign Application Priority Data

Jan. 17, 2024 (IN) ............................ 202411003324

(51) Int. Cl.
*G08G 5/80* (2025.01)
*G08G 5/21* (2025.01)

(52) U.S. Cl.
CPC ................ *G08G 5/80* (2025.01); *G08G 5/21* (2025.01)

(58) Field of Classification Search
None
See application file for complete search history.

(56) References Cited

U.S. PATENT DOCUMENTS 7,765,037 B2 7/2010 Bagge et al.
7,974,773 B1 7/2011 Krenz et al.
(Continued)

FOREIGN PATENT DOCUMENTS

CN 116542004 A * 8/2023 ............ G06F 30/18
CN 116542059 A 8/2023

OTHER PUBLICATIONS

Ali, Hasnain et al., "Dynamic Hot Spot Prediction by Learning Spatial-Temporal Utilization of Taxiway Intersections," Mar. 30, 2020 , IEEE, 2020 International Conference on Artificial Intelligence and Data Analytics for Air Transportation (AIDA-AT), pp. 1-10 (Year: 2020).*

(Continued)

*Primary Examiner* — Madison R. Inserra
(74) *Attorney, Agent, or Firm* — ALSTON & BIRD LLP

(57) ABSTRACT

Embodiments of the present disclosure provide systems and methods for determining intersection threat indices. In one embodiment, geometry data representing a set of pathways in an environment is identified. An initial threat index value for a first intersection is generated based on a quantity of pathways in a subset of the set of pathways defining the first intersection. An intermediate threat index value for the first intersection is generated based on the initial threat index value for the first intersection and at least one other initial threat index value for at least one other intersection determined to be adjacent to the first intersection. A final threat index value is generated based on the intermediate threat index value and dynamically received data. Information indicative of the final threat index value for the first intersection is provided to a user interface.

20 Claims, 9 Drawing Sheets

(56) References Cited

U.S. PATENT DOCUMENTS

| | | | |
|---|---|---|---|
| 8,140,257 | B2 | 3/2012 | Villaume et al. |
| 9,487,304 | B1 | 11/2016 | Bowen et al. |
| 11,176,838 | B2 | 11/2021 | Chartier et al. |
| 2008/0195301 | A1 | 8/2008 | Fabre et al. |
| 2012/0158277 | A1 | 6/2012 | Gayraud et al. |

OTHER PUBLICATIONS

Extended European Search Report Mailed on Jun. 24, 2025 for EP Application No. 24223321, 8 page(s).

* cited by examiner

405

| INTERSECTION | NO OF ENTRY/EXIT SIDES(M) | MAX TRANSITION LINES(N)= C(M,2) | INITIAL THREAT INDEX VALUE |
|---|---|---|---|
| 1 | 3 | 3 | 3 |
| 2 | 4 | 6 | 5 |
| 3 | 5 | 10 | 7 |
| 4 | 6 | 15 | 9 |
| 5 | 7 | 21 | 11 |
| 6 | 8 | 28 | 13 |
| ... | ... | ... | ... |

400

SYSTEMS AND METHODS FOR DETERMINING INTERSECTION THREAT INDICES

CROSS-REFERENCE TO RELATED APPLICATIONS

This application claims priority to and the benefit of foreign Indian Provisional Patent Application No. 202411003324, filed on Jan. 17, 2024 with the Government of India Patent Office and entitled "SYSTEMS AND METHODS FOR DETERMINING INTERSECTION THREAT INDICES," the contents of which are incorporated herein by reference in their entirety.

TECHNICAL FIELD

Embodiments of the present disclosure generally relate to techniques for improved operation of vehicles, and specifically to systems and methods for determining intersection threat indices.

BACKGROUND

In some environments, vehicles may encounter various risks and operational hazards, such as the risk of colliding with other vehicles. In many cases, such collisions between vehicles may be more likely to occur at specific locations, such as intersections. In some examples, an intersection associated with an elevated collision risk when compared to other intersections may be identified using signage or an identifier displayed via a map. In one illustrative example, an airport map providing navigational runway and taxiway layouts for pilots may include callouts that identify hotspots at various locations. A hotspot may be a designated location where collisions between vehicles have historically occurred. However, current techniques for the identification of regions associated with heightened collision risks, such as hotspot mapping, may rely on historical collision data to determine current collision risks, which may fail to account for regions of increased collision risk not associated with previous collisions. Additionally, such conventional techniques for identifying regions of heightened collision risks may be subject to various other challenges, such as challenges stemming from the inefficiency and inaccuracy of manual reporting of historical collisions.

BRIEF SUMMARY

In accordance with a first aspect of the disclosure, a method is provided. In some embodiments, the method is executable by at least one computing device embodied in hardware, software, firmware, and/or any combination thereof as described herein. In some example embodiments, the example method includes identifying geometry data representing a set of pathways in an environment. The example method further includes generating an initial threat index value for a first intersection based at least in part on a quantity of pathways in a subset of the set of pathways defining the first intersection, wherein the initial threat index value for the first intersection indicates a vehicular collision risk level associated with the first intersection. The example method further includes generating an intermediate threat index value for the first intersection based at least in part on the initial threat index value for the first intersection and at least one other initial threat index value for at least one other intersection determined to be adjacent to the first intersection. The example method further includes generating a final threat index value based at least in part on the intermediate threat index value and dynamically received data associated with the environment. The example method further includes providing information indicative of the final threat index value for the first intersection to a user interface.

In some example embodiments of the example method, at least one characteristic of a representation for the first intersection, displayed via the user interface, is visually distinguished based at least in part on the final threat index value.

In some example embodiments of the example method, the at least one characteristic comprises at least one of: (i) a color of the representation, (ii) a size of the representation, or (iii) a font of the representation.

In some example embodiments of the example method, the method further includes detecting a first type of trigger event that triggers the generation of the initial threat index value and the intermediate threat index value; and detecting a second type of trigger event that triggers the generation of the final threat index value.

In some example embodiments of the example method, the first type of trigger event comprises a preconfigured trigger event and the second type of trigger event comprises a dynamically occurring trigger event.

In some example embodiments of the example method, the intermediate threat index value is based at least in part on a determination of whether the initial threat index value for the first intersection and the at least one other initial threat index value for the at least one other intersection are different.

In some example embodiments of the example method, the intermediate threat index value is generated by adding a first value to the initial threat index value in a circumstance where the initial threat index value is equal to the at least one other initial threat index value.

In some example embodiments of the example method, the intermediate threat index value is generated by adding a second value to a higher of: (i) the initial threat index value or (ii) the at least one other initial threat index value in a circumstance where the initial threat index value is different from the at least one other initial threat index value.

In some example embodiments of the example method, the method further includes providing at least one auditory alert based at least in part on the final threat index value.

In some example embodiments of the example method, the at least one auditory alert is provided in response to the final threat index value satisfying a threshold threat index value.

In some example embodiments of the example method, the dynamically received data comprises at least one of: (i) notice to airmen (NOTAM) data or (ii) traffic information services (TIS) data.

In some example embodiments of the example method, the dynamically received data is associated with at least one vehicle operating within the environment.

In some example embodiments of the example method, the geometry data comprises a polygon representative of the first intersection, the polygon comprising a set of lines representative of the subset of the set of pathways.

In accordance with a second aspect of the disclosure, an apparatus is provided. In one example embodiment of the apparatus, an example apparatus includes at least one processor and at least one memory storing instructions that, when executed by the at least one processor, cause the apparatus to perform any one of the methods described herein. A second example apparatus includes means for performing each step of any one of the methods described herein.

In accordance with a third aspect of the disclosure, a system is provided. In one example embodiment of the system, an example system includes at least one user interface and at least one processor configured to perform any one of the methods described herein. A second example apparatus includes means for performing each step of any one of the methods described herein. In one example embodiment of the system, an example system includes at least one non-transitory computer-readable storage medium having computer program code stored thereon that, in execution with at least one processor, is configured for performing any one of the example methods described herein.

DETAILED DESCRIPTION

Figure 1:
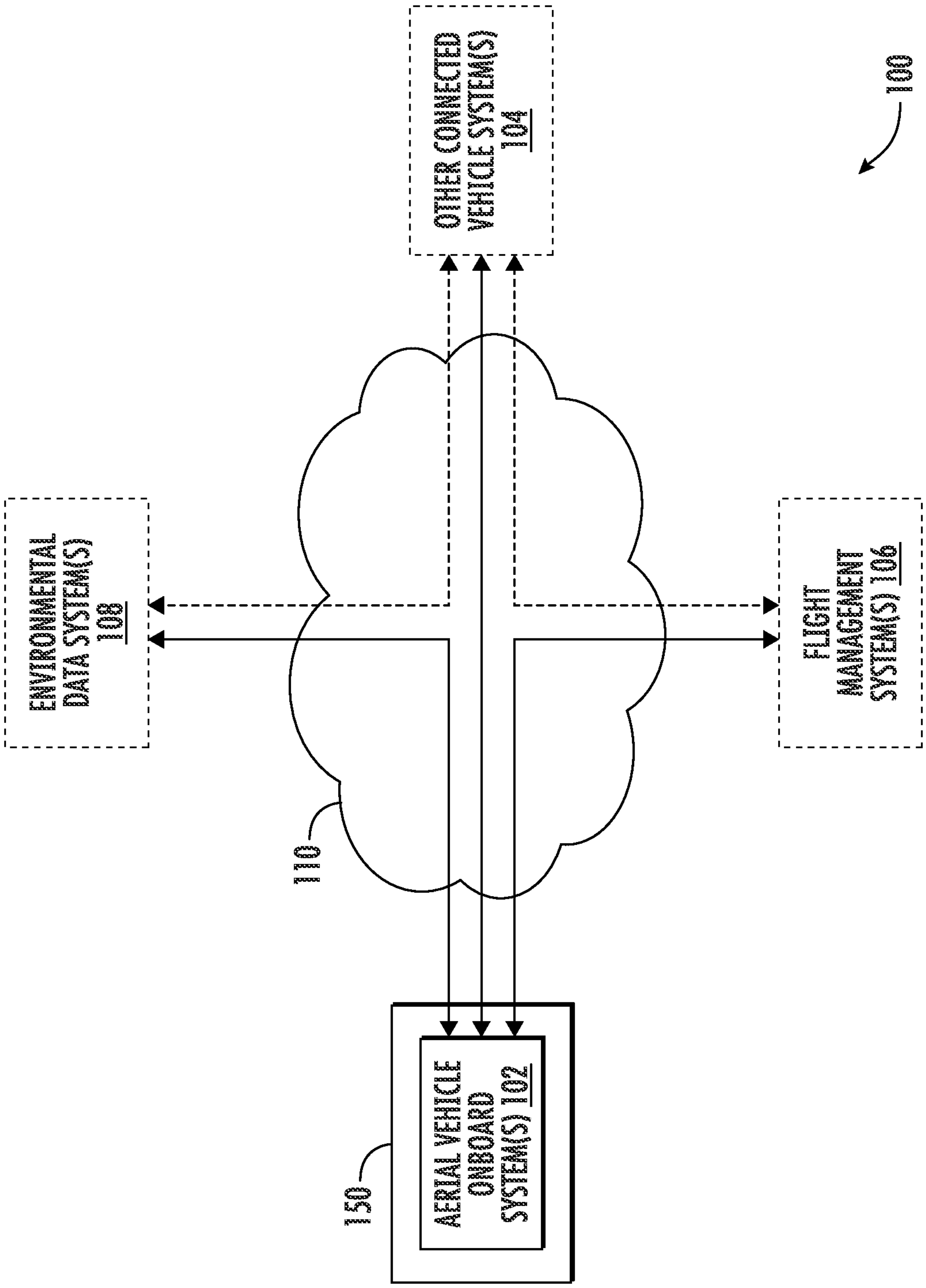
FIG. 1 illustrates a system for determining and communicating threat index values in accordance with at least some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

Overview

In some environments, vehicles may encounter various risks and operational hazards, such as the risk of colliding with other vehicles. In many cases, such collisions between vehicles may be more likely to occur at specific locations, such as intersections. In some examples, an intersection associated with an elevated collision risk when compared to other intersections may be identified using signage or an identifier displayed via a map. In one illustrative example, an airport map providing navigational runway and taxiway layouts for pilots may include callouts that identify hotspots at various locations. A hotspot may be a designated location where collisions between vehicles have historically occurred. However, current techniques for the identification of regions associated with heightened collision risks, such as hotspot mapping, may rely on historical collision data to determine current collision risks, which may fail to account for regions of increased collision risk not associated with previous collisions. Additionally, such conventional techniques for identifying regions of heightened collision risks may be subject to various other challenges, such as challenges stemming from the inefficiency and inaccuracy of manual reporting of historical collisions.

Embodiments of the present disclosure provided improved techniques for identifying regions of heightened collision risk. For example, the techniques described utilize geometry data to identify regions presenting potential hazards for vehicles and associated risk levels. For example, geometry data representative of transportation infrastructure (e.g., indicating locations of taxiways and runways) may be utilized to identify intersections and to generate threat index values indicative of associated collision risk. As described herein, a threat index value may be based on intersection geometry (e.g., including at least one indicator of complexity for at least one intersection) and information received by a vehicle in real time. For example, a threat index value may be based on intersection geometry and a dynamically received notification providing information associated with one or more risks, such as information indicating that another vehicle is approaching an intersection. In some examples, various techniques may be utilized to determine a timing for providing information indicative of at least one threat index value, such that situational awareness of a vehicle operator may be increased at a time when collision risk information is most relevant.

Embodiments of the present disclosure provide a myriad of technical advantages. For example, the techniques of the present disclosure may enable the detection of collision risks not previously detectable using conventional techniques (e.g., collision risks not associated with prior collisions). Additionally, the described techniques may improve a likelihood that a vehicle operator, such as an aircraft pilot, will become aware of collision risks at appropriate times, which may improve transportation safety. In some examples, the communication of information indicative of a threat index value (e.g., the communication of an aural alert, the communication of a visual indication of a threat index) may cause a vehicle operator to perform one or more actions resulting in the avoidance of a collision or reduced collision risk. For example, a vehicle operator may receive an audio indication of a threat index and determine to reduce a speed of the vehicle in response to receiving the audio indication, which may improve a likelihood of collision avoidance.

Definitions

In some embodiments, the term "geometry data" refers to data representative of at least one geometric entity. In some examples, geometry data may be utilized to identify or describe points, lines, and/or shapes (e.g., two-dimensional shapes, polygons, shapes including both straight and curved lines as edges). In some examples, geometry data may be utilized to represent pathways or routes in an environment. For example, in an airport environment, at least one line may be generated to represent a pathway from a runway to a terminal (e.g., a taxiway). Additionally, or alternatively, geometry data may be utilized to represent a plurality of pathways that a vehicle may utilize to travel through an intersection. For example, a line may be generated as a representation of a pathway through an intersection. As one illustrative example, three lines may be generated for a three-way intersection, where each line of the three lines represents a potential pathway along which a vehicle may travel (e.g., a vehicle approaching the intersection from any direction).

In some examples, geometry data may be stored by or generated by a mapping system or mapping database, such as an airport mapping database (AMDB). For example, an AMDB may store geometry data representative of taxiways and runways at an airport. In some examples, multiple types of geometry data may be utilized to represent various geometric features. For example, an AMDB may store a first type of geometry data, such as line data showing outlines of runways and taxiways. In some examples, at least one operation may be performed to generate a second type of geometry data based on the first type of geometry data. For example, the line data showing the outlines of runways and taxiways may be utilized to generate shape data for each intersection shown by the line data. The shape data may include at least one representation of at least one shape, such as a polygon (e.g., a curvilinear polygon), a circle, an ellipse, or any other type of shape. It should be noted that the term "polygon," as described herein may refer to a two-dimensional shape having three or more sides, of which any number of sides may be curved or straight. The at least one shape may surround or otherwise form a perimeter around an intersection. In some examples, a shape may be utilized to highlight or call attention to a location of an intersection. For example, the shape may be displayed via a user interface. In some examples, each shape may include a plurality of lines representative of pathways through an intersection corresponding to the shape.

In some embodiments, the term "pathway" refers to a route or path of travel in an environment. In some examples, a road, a path, a trail, a runway, a taxiway, and/or the like may be examples of pathways. In some other examples, a pathway may not coincide with a road, a path, a trail, a runway, a taxiway, and/or the like. For example, a pathway may represent a path of travel through a parking area or an open space, and accordingly, the pathway may not correspond to a specific road or lane. As another illustrative example, in an airport environment, a vehicle may follow one of several pathways through an intersection, although the pathways may not correspond to a marked lane through the intersection. Additionally, or alternatively, a pathway may be representative of a path of travel through an airspace environment or an aquatic environment (e.g., for mapping surface or below surface movement). In some examples, a pathway may be represented by a straight or curved line, which may be displayed via a user interface. In some examples, the straight or curved line may be represented by or otherwise indicated via geometry data, including at least one numerical representation of the straight or curved line, such as at least one coordinate, point, or node.

In some embodiments, the term "intersection" refers to a crossing or a junction between two or more pathways. For example, two pathways may intersect, which may form a four-way intersection. As another illustrative example, a first pathway may merge with a second pathway, forming a three-way intersection. In some examples, intersections may include crossings or junctions between multiple types of pathways, such as taxiways and runways in an airport environment. In accordance with examples described herein, an intersection may be represented (e.g., graphically, via a user interface) by a polygon (e.g., a curvilinear polygon). The polygon may surround the intersection and include at least one line extending from one edge of the polygon to another edge of the polygon (e.g., a line segment) representative of at least one pathway through the intersection.

An intersection may include a plurality of entry/exit points. An entry/exit point may be a location or region at an edge of an intersection where a vehicle may enter or exit the intersection. In some examples, a plurality of line segments may be generated for each intersection within an environment. Each line segment may represent a pathway through an intersection. Accordingly, the entry/exit points of an intersection may be connected by line segments. For example, if an intersection has three entry/exit points, a first entry/exit point may be connected to a second entry/exit point by a first line segment and to a third entry/exit point by a second line segment. The second entry/exit point may be connected to the first entry/exit point by the first line segment and to the third entry/exit point by a third line segment. Once each line segment for the intersection is generated, the intersection may have a total of three line segments. As described herein, each line segment may represent two potential transitions through an intersection. For example, a line segment connecting a first point and a second point may represent a first path of travel (e.g., a first transition) from the first point to the second point and a second path of travel (e.g., a second transition) from the second point to the first point.

In some examples, line segments for an intersection may be included within a polygon representative of the intersection. Additionally, or alternatively, line segments may be generated for pathways between intersections and may thus connect intersections. In some examples, the network of line segments within intersections and line segments connecting intersections may be referred to as a line network. The line network may provide a depiction or mapping of each potential pathway through an environment. For example, in an airport environment, a line network may depict a connectivity matrix showing each taxiway-taxiway, taxiway-runway, and runway-runway transition. In some examples, an intersection may be identified based on line segment count or geometry. For example, if a polygon includes three or more line segments, the polygon may be identified as representative of an intersection.

In some embodiments, the term "environment" refers to a geographical location or a region of space associated with a particular use. An environment may include at least one vehicle (e.g., at least one type of vehicle) and at least one pathway for vehicular travel. As one illustrative example, an environment may include at least one airport. Although some examples are described with reference to airport environments, the techniques described herein may also apply to other types of environments. For example, the techniques described herein may be applied to environments associated with automotive transportation, rail transportation, maritime transportation, or automated transportation systems utilized in manufacturing or order fulfillment environments.

In some embodiments, the term "threat index value" refers to a value indicating a collision risk level. For example, the threat index value may indicate a likelihood that a collision will occur between two or more vehicles. In some examples, a threat index value may be generated for an intersection. In such examples, the threat index value may represent a likelihood of two or more vehicles colliding in or around the intersection. In one illustrative example, at least one threat index value may be generated for at least one airport intersection, such as a taxiway-taxiway intersection, a runway-taxiway intersection, and a runway-runway intersection. A threat index value may be represented by a number (e.g., an integer or a decimal value), or any other type of character, indicator, or representation configured to convey a degree to which a collision risk is present. For example, a threat index value may be indicated by an integer, where increasing integer values represent increasing collision risks. Additionally, or alternatively, a threat index value may be indicated by a color of a symbol (e.g., a color of a polygon), shape, or character.

As described herein, a threat index value may be updated or revised through multiple iterations. For example, a first threat index value may be generated at a first time, a second threat index value may be generated at a second time by updating the first threat index value, and a third threat index value may be generated at a third time by updating the second threat index value. Stated another way, the generation of a threat index value (e.g., a final threat index value) may include generating an initial threat index value (e.g., $TI_1$), generating an intermediate threat index value (e.g., $TI_2$), and generating the final threat index value (e.g., $TI_3$). As described herein, the phrase "threat index value" may refer to any of an initial threat index value, an intermediate threat index value, and/or a final threat index value.

At least one threat index value may be generated by a computing system (e.g., at least one computing entity, at least one processor of a computing entity). In one example, a first computing entity may be configured to generate at least one initial threat index value and at least one intermediate threat index value, and a second computing entity may be configured to generate at least one final threat index value. In another example, a single computing entity may be configured to generate at least one initial threat index value, at least one intermediate threat index value, and at least one final threat index value. In some examples, the first computing entity may be a computing entity configured to map at least one airport environment, such as an airport mapping entity or AMDB. The second computing entity may be a flight management system (FMS). Accordingly, an AMDB or any other computing entity associated with an AMDB may be configured to generate and store initial threat index values and intermediate threat index values for various intersections of an airport. An FMS may be configured to generate final threat index values (e.g., updated threat index values) based on initial or intermediate threat index values received from an AMDB. In some other examples, an FMS may be configured to generate initial, intermediate, and final threat index values. In some examples, a threat index value, such as an initial threat index value or an intermediate threat index value, may be precomputed and made available by a first computing entity. The threat index value may then be increased or decreased by a second computing entity based on real-time conditions. For example, an algorithm implemented by a computing entity onboard a vehicle may receive an initial threat index value or an intermediate threat index value from an AMDB and generate a final threat index value based on real-time conditions.

In some embodiments, the term "initial threat index value" refers to a value indicating a collision risk level. For example, the initial threat index value may indicate a likelihood that a collision will occur between two or more vehicles. In some examples, an initial threat index value may be generated for an intersection. In such examples, the initial threat index value may represent a likelihood of two or more vehicles colliding in or around the intersection. In some examples, an initial threat index value may represent an initial assessment or evaluation of a vehicular collision risk. The initial assessment may then be refined or updated to arrive at an intermediate threat index value.

In some examples, an initial threat index value may be based on at least one geometry-based rule or condition. For example, an initial threat index value may be based on a quantity of pathways associated with an intersection (e.g., a quantity of line segments in an intersection polygon). In some examples, the quantity of pathways associated with an intersection may be indicative of an intersection complexity, where a greater intersection complexity results in a greater risk level associated with the intersection. In one illustrative example, odd integer values beginning at three may be utilized to represent initial threat index values. For example, a three-way intersection may be assigned an initial threat index value of three, a four-way intersection may be assigned an initial threat index value of five, a five-way intersection may be assigned an initial threat index value of seven, and so forth. In such examples, the use of odd integer values may enable for subsequent adjustment of threat index values by plus or minus one, thereby filling gaps between odd integer values. For example, an intermediate threat index value may be generated by increasing an initial threat index value of three by one, resulting in the intermediate threat index value of four.

In some embodiments, the term "intermediate threat index value" refers to a value indicating a collision risk level. For example, the intermediate threat index value may indicate a likelihood that a collision will occur between two or more vehicles. In some examples, an intermediate threat index value may be generated for an intersection. In such examples, the intermediate threat index value may represent a likelihood of two or more vehicles colliding in or around the intersection. As described herein, the intermediate threat index value may represent an intermediate assessment or evaluation of a vehicular collision risk (e.g., an assessment performed after the generation of the initial threat index value and before the generation of the final threat index value).

In some examples, an intermediate threat index value for a first intersection may be based on an initial threat index value for the first intersection and at least one environmental or contextual condition. For example, an intermediate threat index value for the first intersection may be based on whether the first intersection is adjacent to or within a threshold distance of at least one other second intersection. In some examples, two intersections may be adjacent if intersection polygons for each intersection are in contact. In some examples, an intermediate threat index value for the first intersection may be generated by adjusting an initial threat index value for the first intersection based on the at least one environmental or contextual condition.

In one illustrative example, if a first intersection is adjacent to a second intersection, and both the first intersection and the second intersection have a same initial threat index value, an intermediate threat index value for the first intersection may be one initial threat index value higher (e.g., one odd integer value higher) than the same initial threat index value. Accordingly, if an initial threat index value for a first intersection is three and an initial threat index value for a second intersection adjacent to the first intersection is also three, an intermediate threat index value for the first intersection may be five. Additionally, or alternatively, an intermediate threat index value for the second intersection may be five. Although, in some examples, the second intersection may have a different intermediate threat index value if the second intersection is adjacent to at least one other intersection.

In another illustrative example, if a first intersection having a first initial threat index value is adjacent to a second intersection having a second initial threat index value, an intermediate threat index value for the first intersection may be one integer value higher than a maximum value of the first initial threat index value and the second initial threat index value. Accordingly, if the first initial threat index value is three and the second initial threat index value is five, an intermediate threat index value for the first intersection may be six (e.g., MAX (3,5)+1). Additionally, or alternatively, an intermediate threat index value for the second intersection may be six. Although, in some examples, the second intersection may have a different intermediate threat index value if the second intersection is adjacent to at least one other intersection.

In some embodiments, the term "final threat index value" refers to a value indicating a collision risk level. For example, the final threat index value may indicate a likelihood that a collision will occur between two or more vehicles. In some examples, a final threat index value may be generated for an intersection. In such examples, the final threat index value may represent a likelihood of two or more vehicles colliding in or around the intersection. As described herein, the final threat index value may represent a final assessment or evaluation of a vehicular collision risk (e.g., an assessment performed after the generation of the intermediate threat index value).

In some examples, a final threat index value for an intersection may be based on an intermediate threat index value for the intersection and at least one real-time condition. In some examples, the at least one real-time condition may be indicated by received data (e.g., dynamically received data). For example, the final threat index value may be based on notice to airmen (NOTAM) data or traffic information services (TIS) data, among other examples. As one illustrative example, a computing entity (e.g., installed at a first vehicle) may receive data indicating that a second vehicle is approaching or is present in an intersection. In response to the data (e.g., the approach of the second vehicle indicated by the data), the computing system may generate a final threat index value. The final threat index value may be generated by adding at least one integer value to the intermediate threat index value. For example, the intermediate threat index value may be increased by a value of one or a value of two to arrive at the final threat index value.

In some examples, a final threat index value may be generated dynamically. For example, the generation of a final threat index value may be triggered by the receipt of data (e.g., dynamically received data). Accordingly, the generation of a final threat index may not be performed periodically and may instead be performed at times when relevant data is received. In some examples, a computing entity may be configured to operate utilizing intermediate threat index values if final threat index values have not been generated. For example, a user interface, such as a display of an FMS, may by default display intermediate threat index values or representations of intermediate threat index values and then display at least one final threat index value when the generation of the at least one final threat index value is triggered.

In some embodiments, the term "dynamically received data" refers to data received by a computing system (e.g., a computing entity of a computing system). In some examples, dynamically received data may be received and/or transmitted based on the occurrence of an event. For example, NOTAM data may be an example of dynamically received data and may be transmitted and/or received based on the occurrence of an unplanned event. For example, a runway closure (e.g., an unplanned runway closure due to an emergency landing) may be communicated to at least one vehicle via NOTAM data. In such an example, the communication of the NOTAM data may be described as "dynamically received" given that the communication of the NOTAM data was not transmitted based on a preconfigured transmission schedule, but instead transmitted based on the occurrence of an expected event. In some examples, the receipt of data (e.g., dynamically received data) may constitute a trigger event (e.g., a dynamically occurring trigger event). As described herein, the trigger event may trigger the generation of a threat index value (e.g., a final threat index value). For example, receiving NOTAM data may trigger the generation of a final threat index value that is adjusted based on the NOTAM data.

In some embodiments, the term "information indicative of the final threat index value" refers to information that communicates or otherwise indicates the final threat index value. The information indicative of the final threat index value may be a message (e.g., an alert message) that includes the final threat index value. In some other examples, the information indicative of the final threat index value may be an auditory alert that communicates the final threat index value. In some examples, the auditory alert may include a voice message that states the final threat index value. Additionally, or alternatively, the auditory alert may include at least one alert tone corresponding to at least one final threat index value.

In some examples, the information indicative of the final threat index value may include at least one characteristic, which may be adjusted or configured to indicate a final threat index value. For example, a user interface may display at least one intersection identifier representative of at least one intersection in an environment. In some examples, at least one characteristic of the at least one intersection identifier may be set or adjusted to communicate a final threat index value. For example, a color, a size, a font (e.g., bold, underline, italics, and/or the like), a position, or any other characteristic of an intersection identifier may be utilized to indicate a final threat index value.

In some embodiments, the term "characteristic of an identifier" refers to an attribute, property, quality, of an identifier, which may be utilized to communicate information. In some examples, a characteristic of an identifier may be utilized to communicate information indicative of a final threat index value. For example, an intersection may be identified using a polygon that surrounds the intersection, and a color of the polygon may indicate a final threat index value. In such examples, each color in a color pallet or color spectrum may correspond to a specific final threat index value. In some examples, a characteristic of a text-based identifier may be utilized to communicate a final threat index value. For example, a color of a text label for an intersection may indicate a final threat index value for the intersection.

In some embodiments, the term "user interface" refers to a display or interactive system that enables an individual to receive communications. For example, a user interface may be configured to display information indicative of at least one threat index value, such as information indicative of a final threat index value. In some examples, the user interface may display at least one message including at least one threat index value. In some other examples, the user interface may display other information indicative of the at least one threat index value. For example, the user interface may display polygons representative of intersections, where a color of each polygon indicates a threat index value for the intersection. In some examples, a user interface may be a subcomponent of a computing system, which may itself be a subcomponent of a vehicle. For example, a user interface may be a subcomponent of an FMS of an aircraft.

In some embodiments, the term "auditory alert" refers to an audio signal or audio message that provides information to at least one individual. In some examples, the information may include a warning of at least one risk or hazard, such as a vehicular collision risk. In some examples, an auditory alert may indicate a threat index value or may indicate that a threat index value satisfies a threat index value threshold. For example, an auditory alert may be provided or broadcast to at least one individual (e.g., via a computing system) if a final threat index value satisfies (e.g., is greater than) a final threat index value threshold. Accordingly, upon receiving the auditory alert, an individual operating a vehicle may reduce the speed of the vehicle or perform at least one other action that reduces a likelihood of a collision occurring. In some examples, an auditory alert may include a message, such as an audio message of a recorded voice stating a threat index value or a generalized warning to perform at least one action to reduce collision risk.

In some embodiments, the term "trigger event" refers to an event or action that causes at least one other event or action. For example, the receipt of data or a message including data may constitute a trigger event. As another illustrative example, a timer or clock reaching a specified value may constitute a trigger event. In some examples, a weather event or the occurrence of a collision may be an example of a trigger event. As described herein, trigger events may be classified according to type. For example, a trigger event may be a preconfigured trigger event or a dynamically occurring trigger event. A preconfigured trigger event may occur periodically, at a preconfigured or set interval. For example, a startup or boot process for a computing system may be an example of a preconfigured trigger event. As another example, a preconfigured trigger event may be based on a value of a timer or a clock value. The receipt of a message or an alert may be an example of a dynamically occurring trigger event. In some other examples, a weather event or condition may constitute a dynamically occurring trigger event.

Example Systems and Processes of the Disclosure

FIG. 1 illustrates a system for determining and communicating threat index values in accordance with at least some embodiments of the present disclosure. Specifically, FIG. 1 depicts an example system 100 within which embodiments of the present disclosure may operate to determine and provide threat index values as described herein. As depicted, the system 100 includes at least one aerial vehicle onboard system 102, for example, which embodies at least one system of an aerial vehicle 150, or any other type of vehicle, operating within a particular environment. In some embodiments, the at least one aerial vehicle onboard system 102 is optionally communicable with at least one other computing device and/or system, such as at least one other connected vehicle system 104, flight management system 106, and environmental data system 108. In some embodiments, the at least one aerial vehicle onboard system 102 is communicable with at least one of the other computing devices and/or systems over at least one communications network, such as the communications network 110.

In some embodiments, the at least one aerial vehicle onboard system 102 includes any number of computing devices and/or systems embodied in hardware, software, firmware, and/or a combination thereof that control, operate, and/or are onboard an aerial vehicle 150. For example, in some embodiments, the at least one aerial vehicle onboard system 102 includes at least one physical component of the aerial vehicle 150, including and without limitation at least one display, at least one flight management system, at least one engine, at least one wing, at least one prop, at least one motor, at least one antenna, at least one landing gear, and/or the like. In some embodiments, the at least one aerial vehicle onboard system 102 includes at least one sensor that gathers, collects, and/or otherwise aggregates flight sensor data associated with an aerial vehicle 150 and/or an environment associated therewith. Additionally, or alternatively, in some embodiments, the at least one aerial vehicle onboard system 102 includes at least one computing device and/or system embodied in hardware, software, firmware, and/or a combination thereof, that controls operation of at least one physical component of the aerial vehicle 150, including and without limitation at least one display, at least one flight management system, at least one engine, at least one wing, at least one prop, at least one motor, at least one antenna, at least one landing gear, at least one sensor, and/or the like. Additionally, or alternatively, in some embodiments, the at least one aerial vehicle onboard system 102 includes at least one computing device and/or system embodied in hardware, software, firmware, and/or any combination thereof, that generates at least one user interface capable of being rendered to at least one display of the at least one aerial vehicle onboard system 102. Additionally, or alternatively, in some embodiments, the at least one aerial vehicle onboard system 102 includes at least one computing device and/or system embodied in hardware, software, firmware, and/or any combination thereof, that generates and/or maintains data embodying and/or utilized to recreate a virtual environment including virtual aspects corresponding to and/or associated with a real-world environment and/or a virtual vehicle corresponding to the actual vehicle. It will be appreciated that the aerial vehicle 150 may include any number of physical components that enable the aerial vehicle 150 to operate in a particular manner of airborne travel.

In some embodiments, the at least one aerial vehicle onboard system 102 includes at least one personal computer, end-user terminal, monitor or other display, and/or the like. Additionally, or alternatively, in some embodiments, the at least one aerial vehicle onboard system 102 includes at least one data repository embodied in hardware, software, firmware, and/or any combination thereof to support functionality provided by at least one computing device of the at least one aerial vehicle onboard system 102. In some embodiments the at least one aerial vehicle onboard system 102 includes at least one specially configured integrated system that process data received by and/or controlled by at least one other computing device and/or system of the at least one aerial vehicle onboard system 102.

The at least one other connected vehicle system 104 includes at least one computing device, system, and/or onboard system of at least one other vehicle communicatively coupled with the aerial vehicle associated with at least one aerial vehicle onboard system 102. It will be appreciated that the at least one other connected vehicle system 104 in some embodiments includes at least one computing device and/or at least one system of at least one other aerial vehicle of the same type operating within the same environment as the aerial vehicle associated with at least one aerial vehicle onboard system 102. For example, in some embodiments some of the other connected vehicle systems 104 include at least one computing device and/or system of at least one other aerial vehicle in a fleet of a particular type of aerial vehicle. Additionally, or alternatively, in some embodiments, the at least one other connected vehicle system 104 includes at least one computing device and/or system of at least one ground vehicle, at least one other type of aerial vehicle, and/or the like.

In some embodiments, the at least one aerial vehicle onboard system 102 receives data from at least one of the other connected vehicle systems 104 that provides additional context with respect to the environment in which the aerial vehicle associated with at least one aerial vehicle onboard system 102 is operating. For example, in some embodiments, the at least one aerial vehicle onboard system 102 communicates with at least one other connected vehicle system 104 to determine a position of at least one other aerial vehicle, object, environmental feature (e.g., buildings, terrain, and/or the like) within the environment of the aerial vehicle associated with at least one aerial vehicle onboard system 102, and/or the like. Additionally, or alternatively, in some embodiments, the at least one aerial vehicle onboard system 102 communicate with at least one of the other connected vehicle systems 104 to receive flight sensor data of a particular data type that is not capturable directly by the at least one aerial vehicle onboard system 102. For example, in some embodiments, the aerial vehicle associated with the at least one aerial vehicle onboard system 102 does not include a particular sensor for capturing a particular type of data, and instead receives such data of the particular data type from the at least one other connected vehicle system 104.

In some embodiments, the at least one flight management system 106 includes at least one computing device embodied in hardware, software, firmware, and/or the like that generate, assign, and/or maintain flight plan information and/or other flight detail data for at least one aerial vehicle. For example, in some embodiments, the at least one flight management system 106 includes at least one computing device and/or system of an air traffic control system and/or other authoritative entity that assigns flight detail data (e.g., at least one particular flight plan and/or information associated therewith) to at least one aerial vehicle. Such information may include, without limitation, flight detail data embodying a VFR flight plan, an IFR flight plan, a composite flight plan, and/or the like defining conditions for operating an aerial vehicle within a particular environment.

In some embodiments, the at least one flight management system 106 includes at least one application server, at least one end user terminal, at least one personal computer, at least one mobile device, at least one user device, and/or the like that generate, assign, and/or transmit flight detail data to at least one aerial vehicle. Additionally, or alternatively, in some embodiments, the at least one flight management system 106 includes at least one data repository embodied in hardware, software, firmware, and/or a combination thereof, that stores flight detail data, links between flight detail data and at least one particular aerial vehicle, and/or the like. Additionally, or alternatively, in some embodiments, the at least one flight management system 106 includes at least one computing device and/or system that detect and/or monitor operation of at least one aerial vehicle within an environment. For example, in some embodiments, the at least one flight management system 106 includes at least one radar system that monitors the position of at least one aerial vehicle within a particular portion of an environment.

The at least one environmental data system 108 includes at least one computing device and/or system that includes data representing at least one aspect of a real-world environment, object therein, and/or aerial vehicle therein. In some embodiments, the at least one environmental data system 108 includes at least one data repository that stores data embodying terrain of a particular environment. Additionally, or alternatively, in some embodiments, the at least one environmental data system 108 includes at least one data repository that stores data embodying at least one building, at least one object, and/or at least one other feature within the environment that at least one aerial vehicle in the environment is to avoid or interact with (e.g., for takeoff and/or landing). In some embodiments, the at least one environmental data system 108 embodies a subsystem of the at least one flight management system 106 and/or at least one other connected vehicle system 104. For example, in some embodiments, the at least one environment data system includes a cityscape obstacle database, a vertiport database (e.g., including locations, dimensions, and/or other characteristic of at least one landing zone), and/or the like.

In some embodiments, the at least one environmental data system 108 includes at least one application server, at least one end user terminal, at least one personal computer, at least one mobile device, at least one user device, and/or the like. Additionally, or alternatively, in some embodiments, the at least one environmental data system 108 includes at least one database server specially configured to store data pushed from at least one other computing device and/or system (e.g., the at least one aerial vehicle onboard system 102, at least one other connected vehicle system 104, at least one flight management system 106, and/or the like) and/or retrieve data in response to at least one query from at least one other computing device and/or system. In some embodiments, the at least one environmental data system 108 includes at least one remote and/or cloud computing device accessible to the at least one aerial vehicle onboard system 102, at least one other connected vehicle system 104, and/or at least one flight management system 106 over a communications network, such as the communications network 110.

In some embodiments the communications network 110 enables communication between the various computing devices and/or systems utilizing at least one combination of wireless and/or wired data transmissions and protocols. In this regard, the communications network 110 may embody any of a myriad of network configurations. In some embodiments, the communications network 110 embodies a public network (e.g., the Internet) in whole or in part. In some embodiments, the communications network 110 embodies a private network (e.g., an internal network between particular computing devices) in whole or in part. Additionally, or alternatively, in some embodiments the communications network 110 embodies a direct or private connection facilitated over satellite or radio systems that enables long-range communication between aerial vehicles and corresponding grounded systems. In some other embodiments, the communications network 110 embodies a hybrid network (e.g., a network enabling internal communications between connected computing devices and external communications with other computing devices). The communications network 110 may include at least one base station, at least one relay, at least one router, at least one switch, at least one cell tower, at least one communications cable, at least one satellite, at least one radio antenna and/or at least one related control system, and/or associated routing station, and/or the like. In some embodiments, the communications network 110 includes at least one user entity-controlled computing device and/or other enterprise device (e.g., an end-user's or enterprise router, modem, switch, and/or other network access point) and/or at least one external utility device (e.g., at least one internet service provider communication tower, at least one cell tower, and/or at least one other device). In some embodiments, the at least one aerial vehicle onboard system 102 communicates with at least one of the other connected vehicle systems 104, flight management systems 106, environmental data systems 108 over the communications network 110 to receive and/or transmit information associated with the generation and communication of threat index values as described herein.

Figure 2:
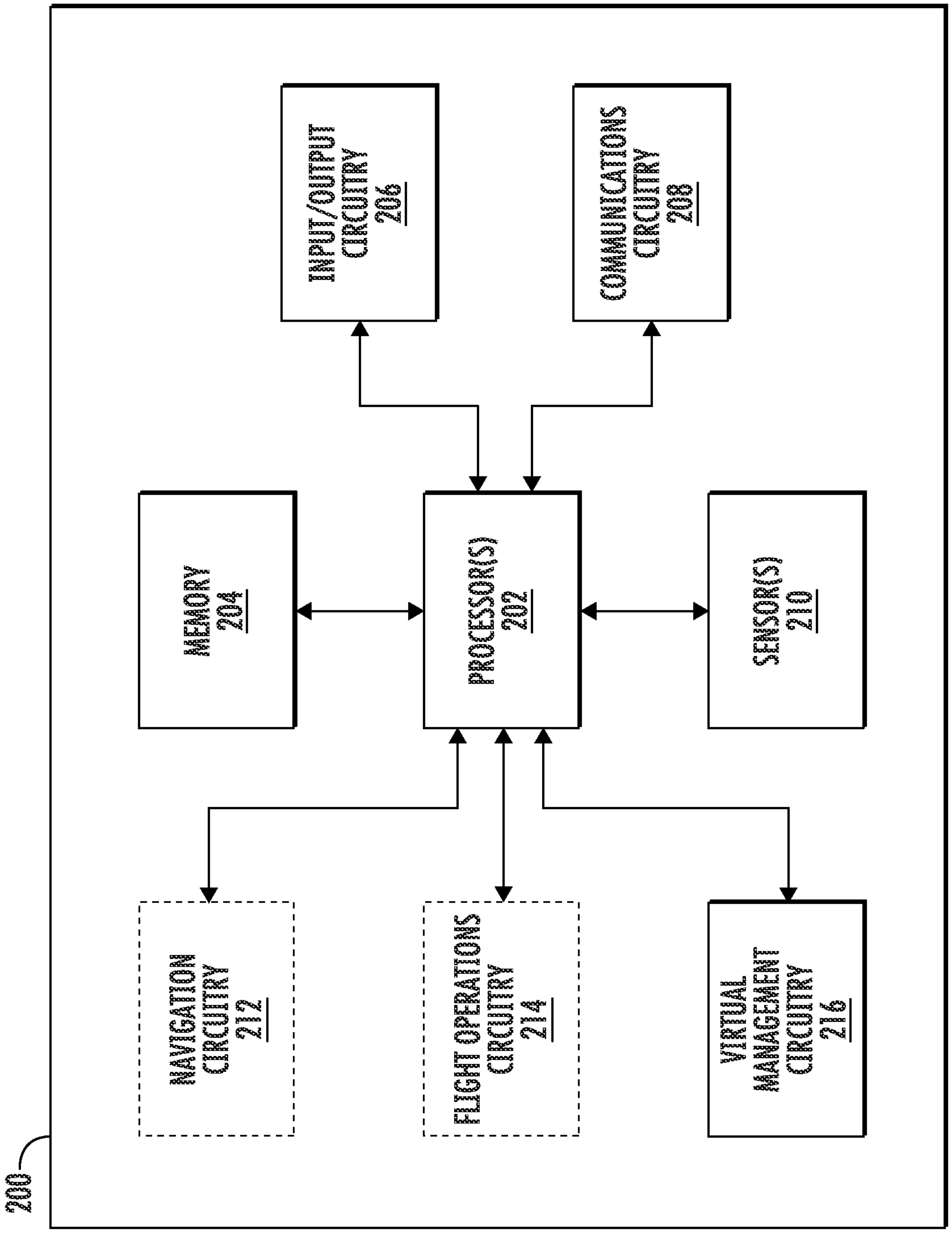
FIG. 2 illustrates a block diagram of a computing entity for generating and communicating threat index values in accordance with at least some embodiments of the present disclosure.

FIG. 2 illustrates a block diagram of a computing entity for generating and communicating threat index values in accordance with at least some embodiments of the present disclosure. Specifically, FIG. 2 depicts a computing entity 200. In some embodiments, at least one computing device and/or system of an aerial vehicle, for example included in or embodied by the at least one aerial vehicle onboard system 102, is embodied by at least one computing device such as the computing entity 200 as depicted and described in FIG. 2. As depicted, the computing entity 200 includes at least one processor 202, at least one memory 204, input/output circuitry 206, communications circuitry 208, at least one sensor 210, navigation circuitry 212, flight operations circuitry 214, and/or virtual management circuitry 216. In some such embodiments, the navigation circuitry 212 and/or the flight operations circuitry 214 is/are optional. In some embodiments, the computing entity 200 is configured, using at least one of the sets of circuitry embodying processor 202, memory 204, input/output circuitry 206, communications circuitry 208, at least one sensor 210, navigation circuitry 212, flight operations circuitry 214, and/or virtual management circuitry 216, to execute the operations described herein.

Although components are described with respect to functional limitations, the particular implementations necessarily include the user of particular computing hardware. It should also be understood that in some embodiments certain of the components described herein include similar or common hardware. For example, two sets of circuitry may both leverage use of the same processor, network interface, storage medium, and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the computing entity 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the computing entity 200. In some embodiments, for example, the memory 204 is non-transitory and includes for example, at least one volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the computing entity 200 to carry out various functions in accordance with example embodiments of the present disclosure.

In various embodiments, the processor 202 is embodied in a number of different ways. For example, in some example embodiments, the processor 202 includes at least one processing device configured to perform independently. Additionally, or alternatively, in some embodiments, the processor 202 includes at least one processor configured in tandem via a bus to enable independent execution of instructions, pipelining, and/or multithreading. The use of the terms "processor" and "processing circuitry" should be understood to include a single core processor, a multi-core processor, multiple processors internal to the computing entity 200, and/or at least one remote or "cloud" processor external to the computing entity 200.

In an example embodiment, the processor 202 is configured to execute instructions stored in the memory 204 or otherwise accessible to the processor 202. Additionally, or alternatively, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Additionally, or alternatively, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with generating and communicating (e.g., to a user interface) threat index values, for example, as described with respect to at least one aerial vehicle onboard system 102 and/or described further herein. In some embodiments, the processor 202 includes hardware, software, firmware, and/or a combination thereof, that generates or receives geometry data corresponding to a real-world environment associated with a particular aerial vehicle. Additionally, or alternatively, in some embodiments, the processor 202 includes hardware, software, firmware, and/or a combination thereof, that generates at least one threat index value based at least in part on the geometry data corresponding to the real-world environment.

Additionally, or alternatively, in some embodiments, the processor 202 includes hardware, software, firmware, and/or a combination thereof, that captures and/or aggregates flight sensor data for use in generating and/or maintaining at least one threat index value for at least one virtual intersection in the associated real-world environment, and/or the like. Additionally, or alternatively, in some embodiments, the processor 202 includes hardware, software, firmware, and/or a combination thereof, that outputs at least one threat index value.

In some embodiments, computing entity 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise at least one user interface and in some embodiments includes at least one display that comprises the at least one interface rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202, and/or input/output circuitry 206 comprising a processor, in some embodiments is configured to control at least one function of at least one user interface element through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user.

The communications circuitry 208 includes any means such as a device or circuitry embodied in either hardware or a combination of hardware and software that is configured to receive and/or transmit data from/to a communications network and/or any other computing device, circuitry, or module in communication with the computing entity 200. In this regard, the communications circuitry 208 includes, for example in some embodiments, a network interface for enabling communications with a wired or wireless communications network. Additionally, or alternatively in some embodiments, the communications circuitry 208 includes at least one network interface card, at least one antenna, at least one bus, at least one switch, at least one router, at least one modem, and supporting hardware, firmware, and/or software, or any other device suitable for enabling communications via at least one communications network. Additionally, or alternatively, the communications circuitry 208 includes circuitry for interacting with the at least one antenna and/or other hardware or software to cause transmission of signals via the at least one antenna or to handle receipt of signals received via the at least one antenna. In some embodiments, the communications circuitry 208 enables transmission to and/or receipt of data from at least one computing device and/or at least one system of at least one other connected vehicle system 104, at least one flight management system 106, and/or at least one environmental data system 108, in communication with the computing entity 200.

The at least one sensor 210 includes hardware, software, firmware, and/or a combination thereof, that supports generation, capturing, aggregating, retrieval, and/or receiving of at least one portion of flight sensor data. In some embodiments, the at least one sensor 210 includes at least one discrete component of an aerial vehicle. The at least one sensor 210 in some embodiments are affixed to, within, and/or otherwise as a part of an aerial vehicle including or otherwise associated with the computing entity 200. For example, in some embodiments, at least one of the sensors 210 is/are mounted to the aerial vehicle. Non-limiting examples of sensors 210 include altimeters (e.g., radio and/or barometric), pressure sensors, pitot tubes, anemometers, image cameras, video cameras, infrared sensors, and/or the like. Additionally, or alternatively, in some embodiments, the at least one sensor 210 includes at least one communication system that enables aggregation of at least one portion of flight sensor data from at least one external computing device and/or system communicable with the computing entity 200, for example at least one other connected vehicle system 104, at least one flight management system 106, and/or at least one environmental data system 108. In some embodiments, the at least one sensor 210 includes any of a myriad of sensors conventionally associated with drones, helicopters, and/or other urban air mobility aerial vehicles. Additionally, or alternatively, in some embodiments, the at least one sensor 210 includes at least one high-sensitivity sensor to facilitate enable high accuracy capturing of data in certain circumstances. For example, in some embodiments, the at least one sensor 210 includes at least one high-sensitivity altimeter that captures detailed altitude information within a few feet (e.g., within tens of feet) from a landing zone. In this regard, such high-sensitivity sensors in some embodiments provide higher-accuracy data when an aerial vehicle is close to a landing zone, where such higher-accuracy data is utilized in depicting accurate positioning of a virtual vehicle corresponding to the aerial vehicle within a virtual environment with respect to a virtual representation of the landing zone and/or a virtual corridor.

In some embodiments, the at least one sensor 210 includes hardware, software, firmware, and/or a combination thereof, embodying at least one navigation sensor. In some embodiments, the at least one navigation sensor includes a global positioning satellite (GPS) tracking chip and/or the like enabling location services to be requested and/or determined for a particular aerial vehicle. Additionally, or alternatively, in some embodiments, the at least one sensor 210 includes hardware, software, firmware, and/or any combination thereof, embodying at least one inertial navigation sensor that measures speed, acceleration, orientation, and/or position-related data in a 3D environment. Additionally, or alternatively, in some embodiments, the at least one sensor 210 includes at least one camera associated with a synthetic vision system (SVS). In some such embodiments, such an SVS camera captures image data representations of the real-world environment around an aerial vehicle for use in generating at least one corresponding user interface depicting the captured image data, augmenting such image data, and/or otherwise providing data to enable an operator to acquire situational awareness based at least in part on the captured image data. It will be appreciated that, in some embodiments, the at least one sensor 210 includes a separate processor, specially configured field programmable gate array (FPGA), or a specially programmed application specific integrated circuit (ASIC).

The optional navigation circuitry 212 includes hardware, software, firmware, and/or a combination thereof, that supports various functionality associated with navigating an aerial vehicle. In some embodiments, navigation circuitry 212 includes hardware, software, firmware, and/or a combination thereof, that receives flight plan data, location service data representing a location of the aerial vehicle, and/or the like. Additionally, or alternatively, in some embodiments, the navigation circuitry 212 includes hardware, software, firmware, and/or a combination thereof, that determines a location of a landing zone from which an aerial vehicle is taking off and/or where an aerial vehicle is landing. Additionally, or alternatively, in some embodiments, the navigation circuitry 212 includes hardware, software, firmware, and/or a combination thereof, that determines a location along a flight path at which an aerial vehicle is to switch operational mode (e.g., to initiate change to and/or from a vertical landing mode and/or vertical takeoff mode). It will be appreciated that, in some embodiments, navigation circuitry 212 includes a separate processor, specially configured field programmable gate array (FPGA), or a specially programmed application specific integrated circuit (ASIC).

The optional flight operations circuitry 214 includes hardware, software, firmware, and/or a combination thereof, that supports various functionality associated with controlling an aerial vehicle. In some embodiments, the flight operations circuitry 214 includes hardware, software, firmware, and/or a combination thereof, that autonomously controls at least one component of an aerial vehicle to facilitate movement of the aerial vehicle along a particular flight path. Additionally, or alternatively, in some embodiments, the flight operations circuitry 214 includes hardware, software, firmware, and/or a combination thereof, that semi-autonomously controls at least one component of an aerial vehicle, for example where certain aspects of the operation of the aerial vehicle are autonomously performed and others (e.g., directional control) is/are controlled by a user (e.g., a pilot). Additionally, or alternatively, in some embodiments, the flight operations circuitry 214 includes hardware, software, firmware, and/or a combination thereof, that receives pilot input for controlling at least one component of an aerial vehicle, for example via vehicle flight controls to alter speed and/or direction of the aerial vehicle. Additionally, or alternatively, in some embodiments, the flight operations circuitry 214 includes hardware, software, firmware, and/or a combination thereof, that causes changes to an operational mode of an aerial vehicle, for example autonomously based at least in part on at least one data-driven event and/or trigger, or in response to user input initiating the change in operational mode. It will be appreciated that, in some embodiments, the flight operations circuitry 214 includes a separate processor, specially configured field programmable gate array (FPGA), or a specially programmed application specific integrated circuit (ASIC).

The virtual management circuitry 216 includes hardware, software, firmware, and/or a combination thereof, that supports various functionality associated with generating and/or maintaining at least one virtual element and/or outputting at least one urban air mobility (UAM) visualization interface embodying at least one view of at least one virtual element. In some embodiments, the virtual management circuitry 216 includes hardware, software, firmware, and/or a combination thereof, that generates a virtual environment based at least in part on flight sensor data. Additionally, or alternatively, in some embodiments, the virtual management circuitry 216 includes hardware, software, firmware, and/or a combination thereof, that generates a virtual vehicle based at least in part on flight sensor data, the virtual vehicle corresponding to an aerial vehicle in a real-world environment. Additionally, or alternatively, in some embodiments, the virtual management circuitry 216 includes hardware, software, firmware, and/or a combination thereof, that generates a virtual corridor based at least in part on flight sensor data. Additionally, or alternatively, in some embodiments, the virtual management circuitry 216 includes hardware, software, firmware, and/or a combination thereof, that maintains at least one virtual element (e.g., a virtual environment, a virtual vehicle, a virtual corridor, and/or the like) as new data is received. For example, in some embodiments, the virtual management circuitry 216 updates a speed, direction, velocity, altitude, and/or other data value associated with a virtual vehicle in a virtual environment as updated flight sensor data associated with a corresponding aerial vehicle is received. Additionally, or alternatively, in some embodiments, the virtual management circuitry 216 includes hardware, software, firmware, and/or a combination thereof, that outputs data embodying a UAM visualization interface from a particular view with respect to the virtual vehicle, for example a profile view, an exocentric view, and/or an egocentric view.

In some embodiments, the virtual management circuitry 216 includes hardware, software, firmware, and/or any combination thereof, that generates at least one user interface element and/or otherwise causes rendering of at least one user interface including at least one specially configured user interface element. For example, in some embodiments, the virtual management circuitry 216 includes hardware, software, firmware, and/or a combination thereof that generates at least one virtual element to be depicted via a UAM visualization interface. For example, in some embodiments, the virtual management circuitry 216 generates a UAM visualization interface depicting a virtual corridor, with or without reliance on maintaining a virtual environment. In some embodiments, the virtual management circuitry 216 includes a graphics processor that generates at least one specially configured virtual user interface element (e.g., a representation of a virtual corridor) based at least in part on flight sensor data, and/or generating sub-interfaces including some or all of such virtual user interface elements and/or other interface elements. Additionally, or alternatively, in some embodiments, the virtual management circuitry 216 includes at least one display embodied in hardware, software, firmware, and/or a combination thereof, that render at least one user interface and/or element thereof. It will be appreciated that, in some embodiments, virtual management circuitry 216 includes a separate processor, specially configured field programmable gate array (FPGA), or a specially programmed application specific integrated circuit (ASIC).

It will be appreciated that, further in some embodiments, two or more of the sets of circuitries 202-216 are combinable. Additionally, or alternatively, in some embodiments, at least one of the sets of circuitry 202-216 perform some or all of the functionality described associated with another component. For example, in some embodiments, at least one of the sets of circuitry 202-216 are combined into a single component embodied in hardware, software, firmware, and/or a combination thereof. For example, in some embodiments, two or more of the navigation circuitry 212, flight operations circuitry 214, and/or virtual management circuitry 216 are embodied by a single set of circuitry that performs the combined operations of the individual sets of circuitry. Similarly, in some embodiments, at least one of the sets of circuitry, for example navigation circuitry 212, flight operations circuitry 214, and/or virtual management circuitry 216, is/are combined with the processor 202, such that the processor 202 performs at least one of the operations described above with respect to each of these other sets of circuitry.

Figure 3:
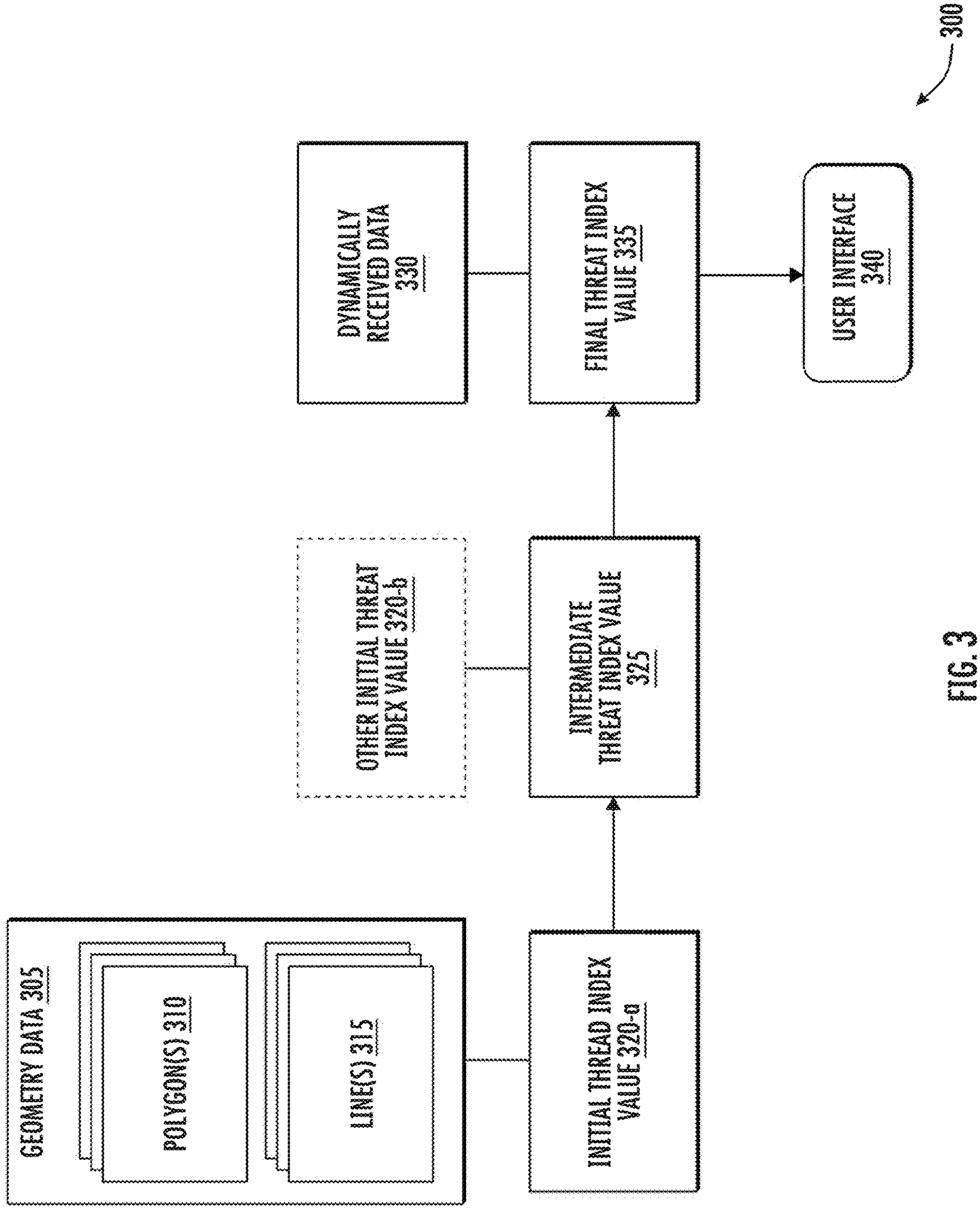
FIG. 3 is a dataflow diagram showing example data structures and modules for generating threat index values in accordance with at least some embodiments of the present disclosure.

FIG. 3 is a dataflow diagram 300 showing example data structures and modules for generating threat index values in accordance with some embodiments discussed herein. The dataflow diagram 300 illustrates data structures and modules for generating at least one initial threat index value 320-*a*, at least one intermediate threat index value 325, and at least one final threat index value 335. Information indicative of the at least one final threat index value 335 may be provided to a user interface 340, which may result in improved situational awareness and improved avoidance of vehicular collisions.

In some embodiments, geometry data 305 representing a set of pathways in an environment may be received. The geometry data 305 may include at least one representation of at least one polygon 310 and at least one representation of at least one line 315. As described herein, at least one initial threat index value 320-*a* for an intersection may be generated based on the geometry data 305. In some examples, geometry data 305 may be data representative of at least one geometric entity. In some examples, geometry data 305 may be utilized to identify or describe points, lines 315, and/or shapes (e.g., two-dimensional shapes, polygons 310, shapes including both straight and curved lines as edges). In some examples, geometry data 305 may be utilized to represent path ways or routes in an environment. For example, in an airport environment, at least one line 315 may be generated to represent a pathway from a runway to a terminal (e.g., a taxiway). Additionally, or alternatively, geometry data 305 may be utilized to represent a plurality of pathways that a vehicle may utilize to travel through an intersection. For example, a line 315 may be generated as a representation of a pathway through an intersection. As one illustrative example, three lines may be generated for a three-way intersection, where each line 315 of the three lines represents a potential pathway along which a vehicle may travel (e.g., a vehicle approaching the intersection from any direction).

In some examples, geometry data 305 may be stored by or generated by a mapping system or mapping database, such as an AMDB. For example, an AMDB may store geometry data 305 representative of taxiways and runways at an airport. In some examples, multiple types of geometry data 305 may be utilized to represent various geometric features. For example, an AMDB may store a first type of geometry data 305, such as line data showing outlines of runways and taxiways. In some examples, at least one operation may be performed to generate a second type of geometry data 305 based on the first type of geometry data 305. For example, the line data showing the outlines of runways and taxiways may be utilized to generate shape data for each intersection shown by the line data. The shape data may include at least one representation of at least one shape, such as a polygon 310 (e.g., a curvilinear polygon), a circle, an ellipse, or any other type of shape. It should be noted that the term "polygon 310," as described herein may refer to a two-dimensional shape having three or more sides, of which any number of sides may be curved or straight. The at least one shape may surround or otherwise form a perimeter around an intersection. In some examples, a shape may be utilized to highlight or call attention to a location of an intersection. For example, the shape may be displayed via a user interface. In some examples, each shape may include a plurality of lines representative of pathways through an intersection corresponding to the shape.

In some examples, a pathway may be a route or path of travel in an environment. In some examples, a road, a path, a trail, a runway, a taxiway, and/or the like may be examples of pathways. In some other examples, a pathway may not coincide with a road, a path, a trail, a runway, a taxiway, and/or the like. For example, a pathway may represent a path of travel through a parking area or open space, and accordingly, the pathway may not correspond to a specific road or lane. As another illustrative example, in an airport environment, a vehicle may follow one of several pathways through an intersection, although the pathways may not correspond to a marked lane through the intersection. Additionally, or alternatively, a pathway may be representative of a path of travel through an airspace environment or an aquatic environment (e.g., for mapping surface or below surface movement). In some examples, a pathway may be represented by a straight or curved line, which may be displayed via a user interface. In some examples, the straight or curved line may be represented by or otherwise indicated via geometry data 305, including at least one numerical representation of the straight or curved line, such as at least one coordinate, point, or node.

In some examples, an intersection may be a crossing or a junction between two or more pathways. For example, two pathways may intersect, which may form a four-way intersection. As another illustrative example, a first pathway may merge with a second pathway, forming a three-way intersection. In some examples, intersections may include crossings or junctions between multiple types of pathways, such as taxiways and runways in an airport environment. In accordance with examples described herein, an intersection may be represented (e.g., graphically, via a user interface) by a polygon 310 (e.g., a curvilinear polygon). The polygon 310 may surround the intersection and include at least one line 315 (e.g., line segment) representative of pathways through the intersection.

An intersection may include a plurality of entry/exit points. An entry/exit point may be a location or region at an edge of an intersection where a vehicle may enter or exit the intersection. In some examples, a plurality of lines 315 may be generated for each intersection within an environment. Each line 315 may represent a pathway through an intersection. Accordingly, the entry/exit points of an intersection may be connected by lines 315. For example, if an intersection has three entry/exit points, a first entry/exit point may be connected to a second entry/exit point by a first line 315 and to a third entry/exit point by a second line 315. The second entry/exit point may be connected to the first entry/exit point by the first line 315 and to the third entry/exit point by a third line 315. Once each line 315 for the intersection is generated, the intersection may have a total of three lines 315. As described herein, each line 315 may represent two potential transitions through an intersection. For example, a line 315 connecting a first point and a second point may represent a first path of travel (e.g., a first transition) from the first point to the second point and a second path of travel (e.g., a second transition) from the second point to the first point.

In some examples, lines 315 for an intersection may be included within a polygon 310 representative of the intersection. Additionally, or alternatively, lines 315 may be generated for pathways between intersections and may thus connect intersections. In some examples, the network of lines 315 within intersections and lines 315 connecting intersections may be referred to as a line network. The line network may provide a depiction or mapping of each potential pathway through an environment. For example, in an airport environment, a line network may depict a connectivity matrix showing each taxiway-taxiway, taxiway-runway, and runway-runway transition. In some examples, an intersection may be identified based on line 315 count or geometry. For example, if a polygon 310 includes three or more lines 315, the polygon 310 may be identified as representative of an intersection.

In some examples, an environment may be a geographical location, or a region of space associated with a particular use. An environment may include at least one vehicle (e.g., at least one type of vehicle) and at least one pathway for vehicular travel. As one illustrative example, an environment may include at least one airport. Although some examples are described with reference to airport environments, the techniques described herein may also apply to other types of environments. For example, the techniques described herein may be applied to environments associated with automotive transportation, rail transportation, maritime transportation, or automated transportation systems utilized in manufacturing or order fulfillment environments.

In some embodiments, an initial threat index value 320-*a* for a first intersection may be generated based at least in part on a quantity of pathways in a subset of the set of pathways defining the first intersection. In some embodiments, the initial threat index value 320-*a* for the first intersection indicates a vehicular collision risk level associated with the first intersection. In some examples, an initial threat index value 320-*a* may be a value indicating a collision risk level. For example, the initial threat index value 320-*a* may indicate a likelihood that a collision will occur between two or more vehicles. In some examples, an initial threat index value 320-*a* may be generated for an intersection. In such examples, the initial threat index value 320-*a* may represent a likelihood of two or more vehicles colliding in or around the intersection. In some examples, an initial threat index value 320-*a* may represent an initial assessment or evaluation of a vehicular collision risk. The initial assessment may then be refined or updated to arrive at an intermediate threat index value 325.

In some examples, an initial threat index value 320-*a* may be based on at least one geometry-based rule or condition. For example, an initial threat index value 320-*a* may be based on a quantity of pathways associated with an intersection (e.g., a quantity of lines 315 in an intersection polygon 310). In some examples, the quantity of pathways associated with an intersection may be indicative of an intersection complexity, where a greater intersection complexity results in a greater risk level associated with the intersection. In one illustrative example, odd integer values beginning at three may be utilized to represent initial threat index values 320. For example, a three-way intersection may be assigned an initial threat index value 320-*a* of three, a four-way intersection may be assigned an initial threat index value 320-*a* of five, a five-way intersection may be assigned an initial threat index value 320-*a* of seven, and so forth. In such examples, the use of odd integer values may enable for subsequent adjustment of threat index values by plus or minus one, thereby filling gaps between odd integer values. For example, an intermediate threat index value 325 may be generated by increasing an initial threat index value 320-*a* of three by one, resulting in the intermediate threat index value 325 of four.

In some embodiments, an intermediate threat index value 325 for the first intersection may be generated based at least in part on the initial threat index value 320-*a* for the first intersection and at least one other initial threat index value 320-*b* for at least one other intersection determined to be adjacent to the first intersection. In some examples, an intermediate threat index value 325 may be a value indicating a collision risk level. For example, the intermediate threat index value 325 may indicate a likelihood that a collision will occur between two or more vehicles. In some examples, an intermediate threat index value 325 may be generated for an intersection. In such examples, the intermediate threat index value 325 may represent a likelihood of two or more vehicles colliding in or around the intersection. As described herein, the intermediate threat index value 325 may represent an intermediate assessment or evaluation of a vehicular collision risk (e.g., an assessment performed after the generation of the initial threat index value 320-*a* and before the generation of the final threat index value).

In some examples, an intermediate threat index value 325 for a first intersection may be based on an initial threat index value 320-*a* for the first intersection and at least one environmental or contextual condition. For example, an intermediate threat index value 325 for the first intersection may be based on whether the first intersection is adjacent to or within a threshold distance of at least one other second intersection. In some examples, two intersections may be adjacent if intersection polygons 310 for each intersection are in contact. In some examples, an intermediate threat index value 325 for the first intersection may be generated by adjusting an initial threat index value 320-*a* for the first intersection based on the at least one environmental or contextual condition.

In one illustrative example, if a first intersection is adjacent to a second intersection, and both the first intersection and the second intersection have a same initial threat index value 320, an intermediate threat index value 325 for the first intersection may be one initial threat index value 320 higher (e.g., one odd integer value higher) than the same initial threat index value 320. Accordingly, if an initial threat index value 320-*a* for a first intersection is three and an initial threat index value 320-*b* for a second intersection adjacent to the first intersection is also three, an intermediate threat index value 325 for the first intersection may be five. Additionally, or alternatively, an intermediate threat index value 325 for the second intersection may be five. Although, in some examples, the second intersection may have a different intermediate threat index value 325 if the second intersection is adjacent to at least one other intersection.

In another illustrative example, if a first intersection having a first initial threat index value 320-*a* is adjacent to a second intersection having a second initial threat index value 320-*b*, an intermediate threat index value 325 for the first intersection may be one integer value higher than a maximum value of the first initial threat index value 320-*a* and the second initial threat index value 320-*b*. Accordingly, if the first initial threat index value 320-*a* is three and the second initial threat index value 320-*b* is five, an intermediate threat index value 325 for the first intersection may be six (e.g., MAX (3,5)+1). Additionally, or alternatively, an intermediate threat index value 325 for the second intersection may be six. Although, in some examples, the second intersection may have a different intermediate threat index value 325 if the second intersection is adjacent to at least one other intersection.

In some embodiments, a final threat index value may be generated based at least in part on the intermediate threat index value 325 and dynamically received data 330 associated with the environment. In some examples, a final threat index value may be a value indicating a collision risk level. For example, the final threat index value may indicate a likelihood that a collision will occur between two or more vehicles. In some examples, a final threat index value may be generated for an intersection. In such examples, the final threat index value may represent a likelihood of two or more vehicles colliding in or around the intersection. As described herein, the final threat index value may represent a final assessment or evaluation of a vehicular collision risk (e.g., an assessment performed after the generation of the intermediate threat index value 325).

In some examples, a final threat index value for an intersection may be based on an intermediate threat index value 325 for the intersection and at least one real-time condition. In some examples, the at least one real-time condition may be indicated by received data (e.g., dynamically received data 330). For example, the final threat index value may be based on notice to airmen (NOTAM) data or traffic information services (TIS) data, among other examples. As one illustrative example, a computing entity (e.g., installed at a first vehicle) may receive data indicating that a second vehicle is approaching or is present in an intersection. In response to the data (e.g., the approach of the second vehicle indicated by the data), the computing system may generate a final threat index value. The final threat index value may be generated by adding at least one integer value to the intermediate threat index value 325. For example, the intermediate threat index value 325 may be increased by a value of one or a value of two to arrive at the final threat index value.

In some examples, a final threat index value may be generated dynamically. For example, the generation of a final threat index value may be triggered by the receipt of data (e.g., dynamically received data 330). Accordingly, the generation of a final threat index may not be performed periodically and may instead be performed at times when relevant data is received. In some examples, a computing entity may be configured to operate utilizing intermediate threat index values 325 if final threat index values 335 have not been generated. For example, a user interface, such as a display of an FMS, may by default display intermediate threat index values 325 or representations of intermediate threat index values 325 and then display at least one final threat index value when the generation of the at least one final threat index value is triggered.

In some examples, dynamically received data 330 may be data received by a computing system (e.g., a computing entity of a computing system). In some examples, dynamically received data 330 may be received and/or transmitted based on the occurrence of an event. For example, NOTAM data may be an example of dynamically received data 330 and may be transmitted and/or received based on the occurrence of an unplanned event. For example, a runway closure (e.g., an unplanned runway closure due to an emergency landing) may be communicated to at least one vehicle via NOTAM data. In such an example, the communication of the NOTAM data may be described as "dynamically received" given that the communication of the NOTAM data was not transmitted based on a preconfigured transmission schedule, but instead transmitted based on the occurrence of an expected event. In some examples, the receipt of data (e.g., dynamically received data 330) may constitute a trigger event (e.g., a dynamically occurring trigger event). As described herein, the trigger event may trigger the generation of a threat index value (e.g., a final threat index value 335). For example, receiving NOTAM data may trigger the generation of a final threat index value 335 that is adjusted based on the NOTAM data.

In some embodiments, information indicative of the final threat index value 335 for the first intersection may be provided to a user interface. In some examples, information indicative of the final threat index value 335 may be information that communicates or otherwise indicates the final threat index value 335. The information indicative of the final threat index value 335 may be a message (e.g., an alert message) that includes the final threat index value 335. In some other examples, the information indicative of the final threat index value 335 may be an auditory alert that communicates the final threat index value 335. In some examples, the auditory alert may include a voice message that states the final threat index value 335. Additionally, or alternatively, the auditory alert may include at least one alert tone corresponding to at least one final threat index value 335.

In some examples, the information indicative of the final threat index value 335 may include at least one characteristic, which may be adjusted or configured to indicate a final threat index value 335. For example, a user interface may display at least one intersection identifier representative of at least one intersection in an environment. In some examples, at least one characteristic of the at least one intersection identifier may be set or adjusted to communicate a final threat index value 335. For example, a color, a size, a font (e.g., bold, underline, italics, and/or the like), a position, or any other characteristic of an intersection identifier may be utilized to indicate a final threat index value 335.

In some examples, a characteristic of an identifier may be an attribute, property, quality, of an identifier, which may be utilized to communicate information. In some examples, a characteristic of an identifier may be utilized to communicate information indicative of a final threat index value 335. For example, an intersection may be identified using a polygon 310 that surrounds the intersection, and a color of the polygon 310 may indicate a final threat index value 335. In such examples, each color in a color pallet or color spectrum may correspond to a specific final threat index value 335. In some examples, a characteristic of a text-based identifier may be utilized to communicate a final threat index value 335. For example, a color of a text label for an intersection may indicate a final threat index value 335 for the intersection.

In some examples, a user interface may be a display or interactive system that enables an individual to receive communications. For example, a user interface may be configured to display information indicative of at least one threat index value, such as information indicative of a final threat index value 335. In some examples, the user interface may display at least one message including at least one threat index value. In some other examples, the user interface may display other information indicative of the at least one threat index value. For example, the user interface may display polygons 310 representative of intersections, where a color of each polygon 310 indicates a threat index value for the intersection. In some examples, a user interface may be a subcomponent of a computing system, which may itself be a subcomponent of a vehicle. For example, a user interface may be a subcomponent of an FMS of an aircraft.

In some examples, an auditory alert may be an audio signal or audio message that provides information to at least one individual. In some examples, the information may include a warning of at least one risk or hazard, such as a vehicular collision risk. In some examples, an auditory alert may indicate a threat index value or may indicate that a threat index value satisfies a threat index value threshold. For example, an auditory alert may be provided or broadcast to at least one individual (e.g., via a computing system) if a final threat index value 335 satisfies (e.g., is greater than) a final threat index value threshold. Accordingly, upon receiving the auditory alert, an individual operating a vehicle may reduce the speed of the vehicle or perform at least one other action that reduces a likelihood of a collision occurring. In some examples, an auditory alert may include a message, such as an audio message of a recorded voice stating a threat index value or a generalized warning to perform at least one action to reduce collision risk.

In some examples, a trigger event may be an event or action that causes at least one other event or action. For example, the receipt of data or a message including data may constitute a trigger event. As another illustrative example, a timer reaching or clock reaching a specified value may constitute a trigger event. In some examples, a weather event or the occurrence of a collision may be an example of a trigger event. As described herein, trigger events may be classified according to type. For example, a trigger event may be a preconfigured trigger event or a dynamically occurring trigger event. A preconfigured trigger event may occur periodically, at a preconfigured or set interval. For example, a startup or boot process for a computing system may be an example of a preconfigured trigger event. As another example, a preconfigured trigger event may be based on a value of a timer or a clock value. The receipt of a message or an alert may be an example of a dynamically occurring trigger event. In some other examples, a weather event or condition may constitute a dynamically occurring trigger event.

Figure 4:
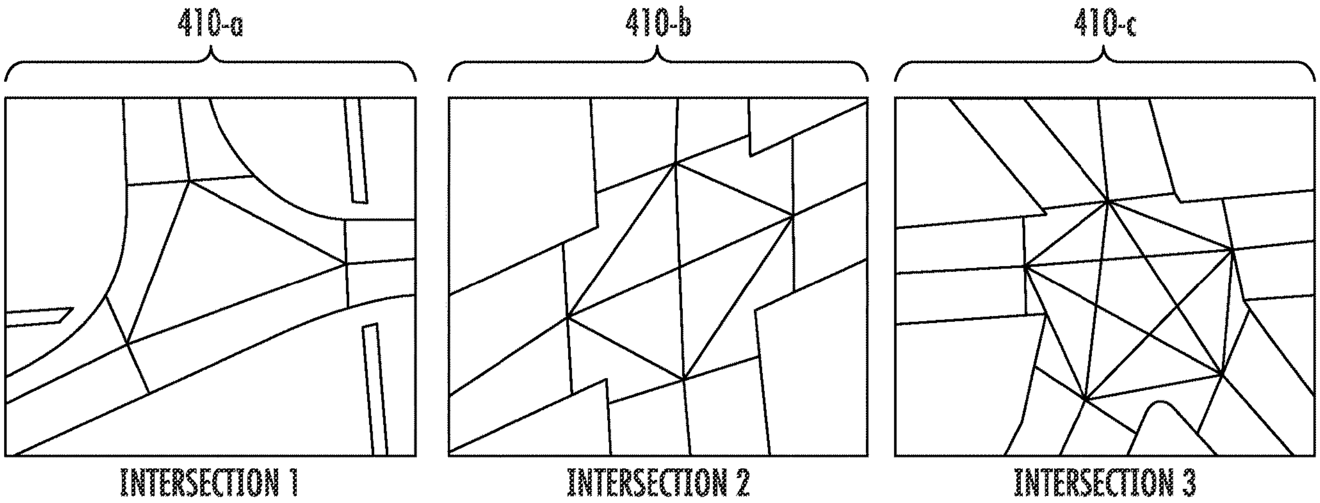
FIG. 4 is an operational example of a mapping table and intersections in accordance with at least some embodiments of the present disclosure.

FIG. 4 is an operational example 400 of a mapping table 405 and intersections 410 in accordance with some embodiments discussed herein. As described herein, the mapping table 405 may be utilized to identify an initial threat index value for a specific intersection type having a specific quantity of entry/exit sides, M. For example, as indicated by the mapping table 405, the intersection 410-*a* (e.g., intersection 1) may have three entry/exit sides and an initial threat index value of three. As another illustrative example, the intersection 410-*b* (e.g., intersection 2) may have four entry/exit sides and an initial threat index value of five. In some examples, the mapping table 405 may be utilized to identify an initial threat index value for a specific quantity of line segments (e.g., max transition lines, N) within a specific intersection. For example, the intersection 410-*a* may include three line segments, which corresponds to an initial threat index value of three.

The quantity of line segments (e.g., max transition lines, N) for an intersection may be determined based on a quantity of entry/exit sides for the intersection, M. For example, the quantity of line segments may be calculated using the equation shown below.

$$C(M,2)=M!/2!(M-2)!$$

In the equation, M is the quantity of entry/exit sides for the intersection and C (M,2) is the quantity of line segments within the intersection. In a generic sense, if an intersection has M entry/exit sides, then there are at most $M_{c2}$ line segments (e.g., transition lines) calculated using the equation.

Figure 5A:
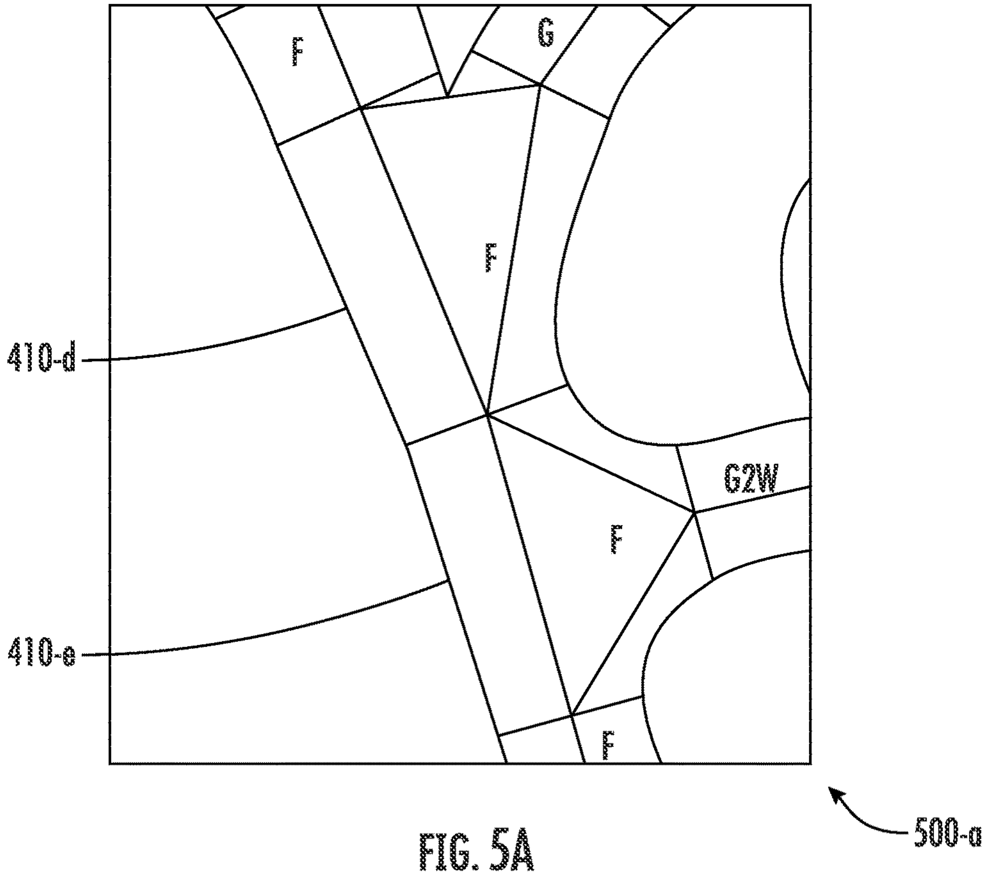
FIGS. 5A and 5B are operational examples of intersection configurations in accordance with at least some embodiments of the present disclosure.

FIG. 5A is an operational example 500-*a* of an intersection configuration in accordance with some embodiments discussed herein. For example, the operational example 500-*a* includes two adjacent intersections 410 having a same quantity of branches (e.g., a same quantity of line segments, a same quantity of pathways), and accordingly, a same initial threat index value. The techniques described herein provide an example process for generating intermediate threat index values for adjacent intersections that have a same initial threat index value.

In some examples, an intermediate threat index value for an intersection 410 may be based on whether the intersection 410 is adjacent to at least one other intersection 410 and whether the intersection has a same or different initial threat index value than the at least one other intersection 410. For example, if two intersections 410 are adjacent and have a same initial threat index value, an intermediate threat index value for each of the two intersections 410 may be generated by increasing the initial threat index value by two (e.g., one threat index value higher with respect to the mapping table 405). For example, the intersection 410-*d* and the intersection 410-*e*, which are adjacent to one another, have a same initial threat index value of three. Accordingly, the intersection 410-*d* and the intersection 410-*e* each have an intermediate threat index value of five.

Figure 5B:
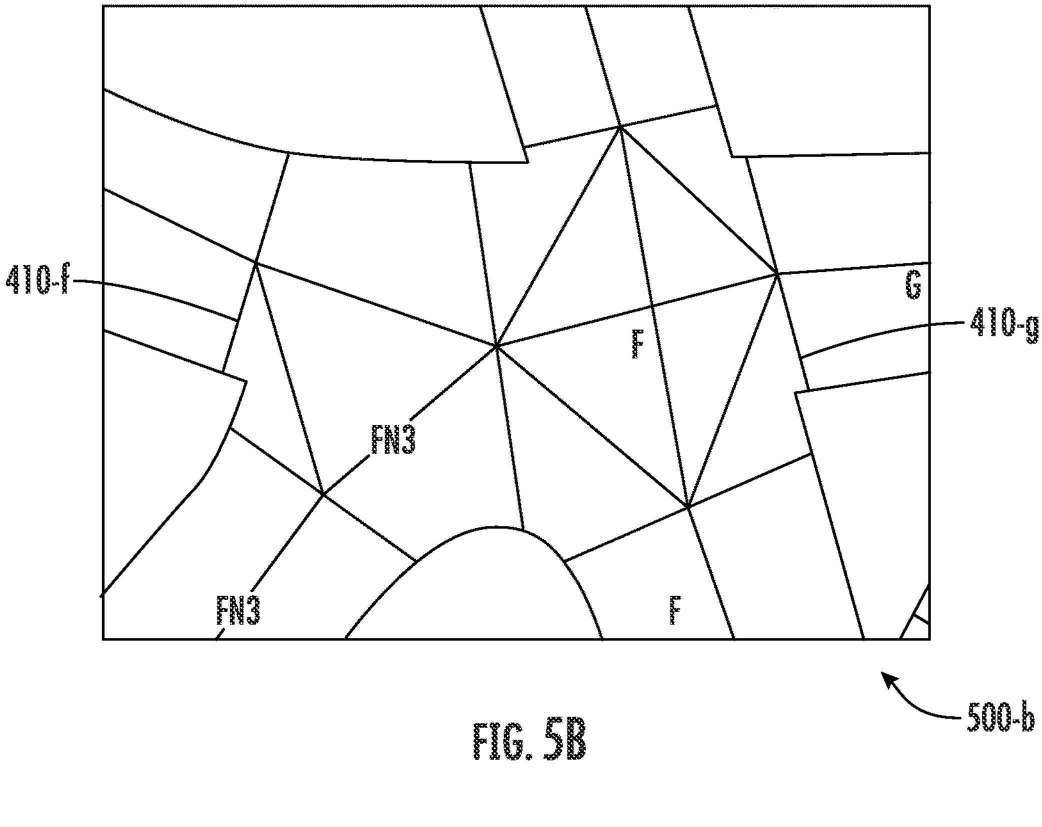

FIG. 5B is an operational example 500-*b* of an intersection configuration in accordance with some embodiments discussed herein. For example, the operational example 500-*b* includes two adjacent intersections 410 having different quantities of branches (e.g., different quantities of line segments, different quantities of pathways), and accordingly, different initial threat index values. The techniques described herein provide an example process for generating intermediate threat index values for adjacent intersections that have different initial threat index values.

In some examples, an intermediate threat index value for an intersection 410 may be based on whether the intersection 410 is adjacent to at least one other intersection 410 and whether the intersection has a same or different initial threat index value than the at least one other intersection 410. For example, if two intersections 410 are adjacent and have a different initial threat index value, an intermediate threat index value for each of the two intersections 410 may be generated by increasing the higher initial threat index value by one (e.g., MAX (first initial threat index value, second initial threat index value)+1). As depicted in the operational example 500-*b*, the intersection 410-*f* and the intersection 410-*g*, which are adjacent to one another, have different initial threat index values. For example, the intersection 410-*f* has an initial threat index value of three and the intersection 410-*g* has an initial threat index value of five. Accordingly, the intersection 410-*f* and the intersection 410-*g* each have intermediate threat index values of six (e.g., MAX (3,5)+1).

Figure 6:
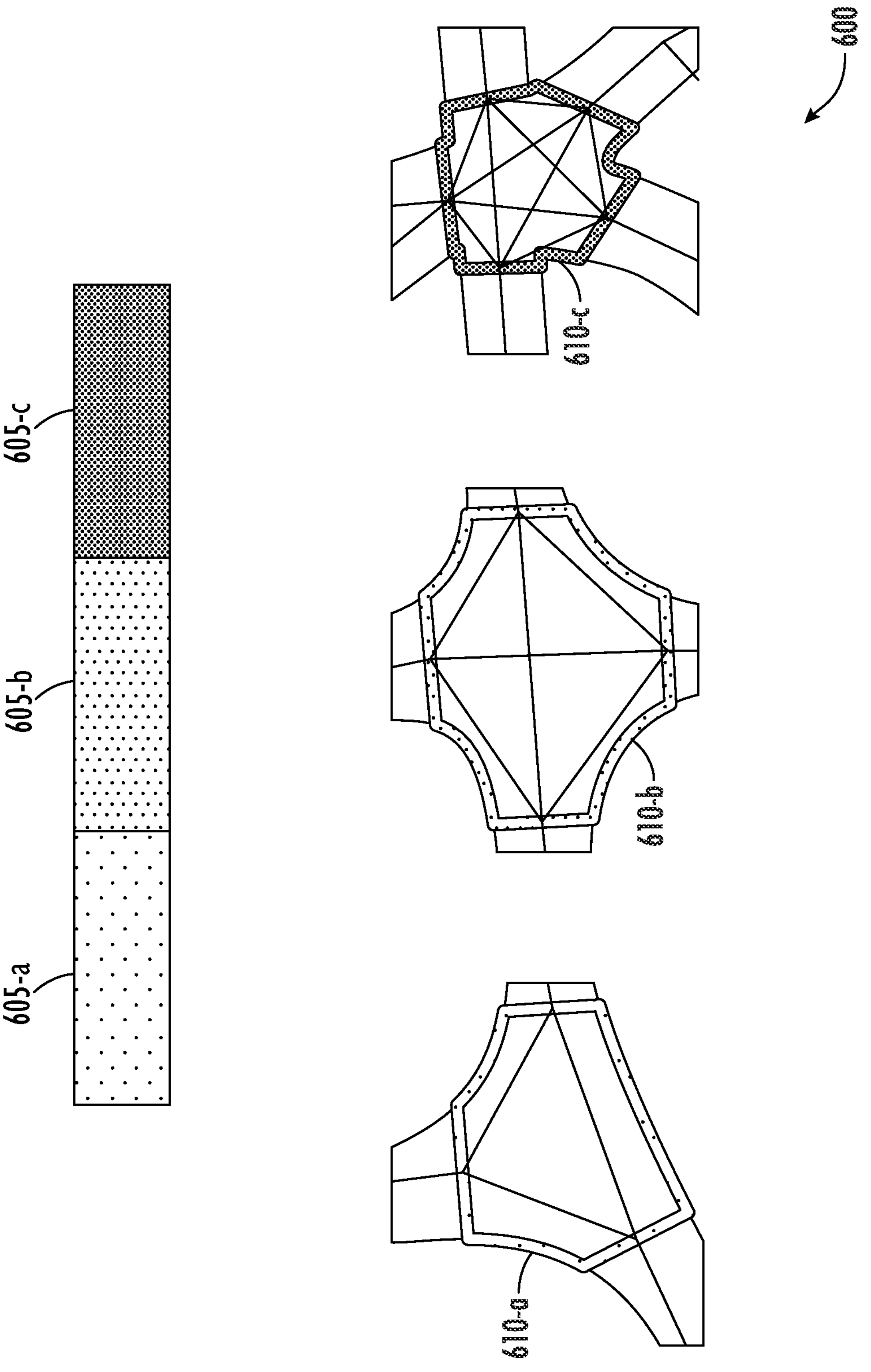
FIG. 6 is an operational example of a display configuration for emphasizing intersections based on threat index values in accordance with at least some embodiments of the present disclosure.

FIG. 6 is an operational example 600 of a display configuration for emphasizing intersections based on threat index values in accordance with some embodiments discussed herein. For example, the operational example 600 may include polygons 610, which may be displayed via a user interface. As described herein, a color coding scheme (e.g., a color ramp) or a fill pattern scheme may be utilized to represent varying threat index values. For example, the polygon 610-*a* may be representative of a first intersection with a first final threat index value. The polygon 610-*a* may be displayed using a color 605-*a*, which may correspond to the first final threat index value. Similarly, the polygon 610-*b* may be representative of a second intersection with a second final threat index value (e.g., higher than the first final threat index value). The polygon 610-*b* may be displayed using a color 605-*b*, which may correspond to the second final threat index value. Similarly, the polygon 610-*c* may be representative of a third intersection with a third final threat index value (e.g., higher than the second final threat index value). The polygon 610-*c* may be displaying using a color 605-*c*, which may correspond to the third final threat index value. Although one illustrative example described herein refers to three colors 605, any quantity of colors of fill patterns may be utilized to represent respective final threat index values.

Figure 7:
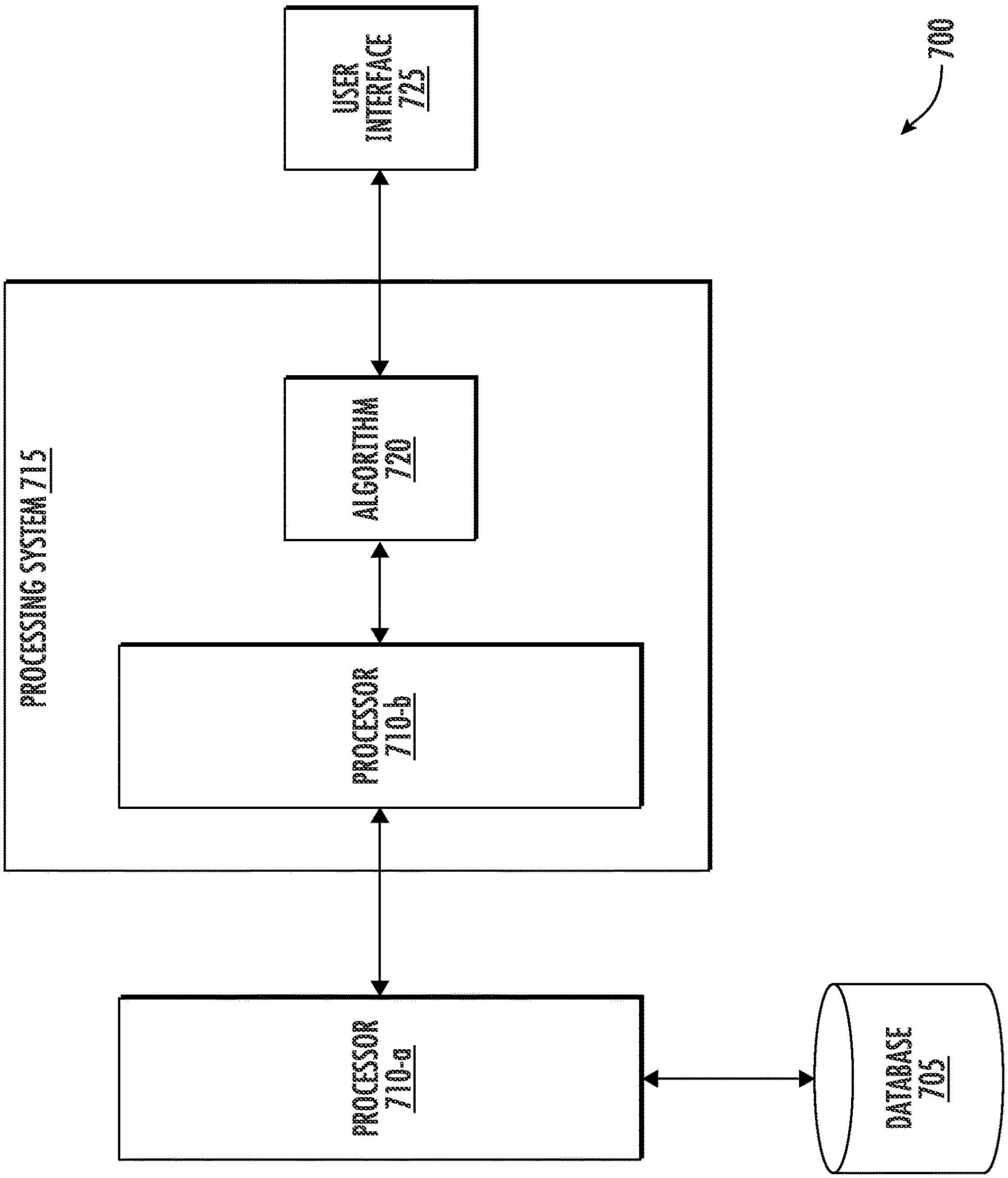
FIG. 7 is an operational example of a system for generating and communicating threat index values in accordance with at least some embodiments of the present disclosure.

FIG. 7 is an operational example of a system 700 for generating and communicating threat index values in accordance with some embodiments discussed herein. The system 700 may include at least one component of at least one computing entity 200. For example, a computing entity 200, as described with reference to FIG. 2 may include the database 705, the processor 710-*a*, the processor 710-*b*, the algorithm 720, and the user interface 725. In some other examples, the components of the system 700 may be included in at least one computing entity 200. For example, a first computing entity may include the database 705 and a second computing entity may include the processor 710-*a*, the processor 710-*b*, the algorithm 720, and the user interface 725.

In some examples, the system 700 may be a functional block diagram of system 700 (e.g., an aircraft system) configured to fetch (e.g., request and receive) geometry data (e.g., an airport layout) from the database 705 (e.g., an AMDB). In some examples, the system 700 may be configured to fetch at least one pre-computed (e.g., by the database 705 or at least one computing entity 200 associated with the database 705) intermediate threat index value for at least one intersection. The processor 710-*a* may be configured to generate at least one final threat index value by increasing or decreasing the intermediate threat index values based on real-time conditions, received data, or both. For example, the processor 710-*a* may adjust at least one intermediate threat index value based on at least one NOTAM, at least one TIS message, or both. The at least one final threat index value may be communicated to the processing system 715 (e.g., to the processor 710-*b*). In some examples, the processing system 715 may be an FMS of an aircraft that hosts an algorithm 720 to emphasize intersections. In some examples, the algorithm 720 may identify at least one appropriate time to graphically emphasize intersections (e.g., using graduated symbols, using color coded polygons, using aural alerts) based on threat index values. For example, an intersection polygon may be visually emphasized on a user interface 725 when a vehicle is within a threshold distance of the intersection. In some examples, the algorithm may trigger an aural alert to a pilot (e.g., at the at least one appropriate time).

Figure 8:
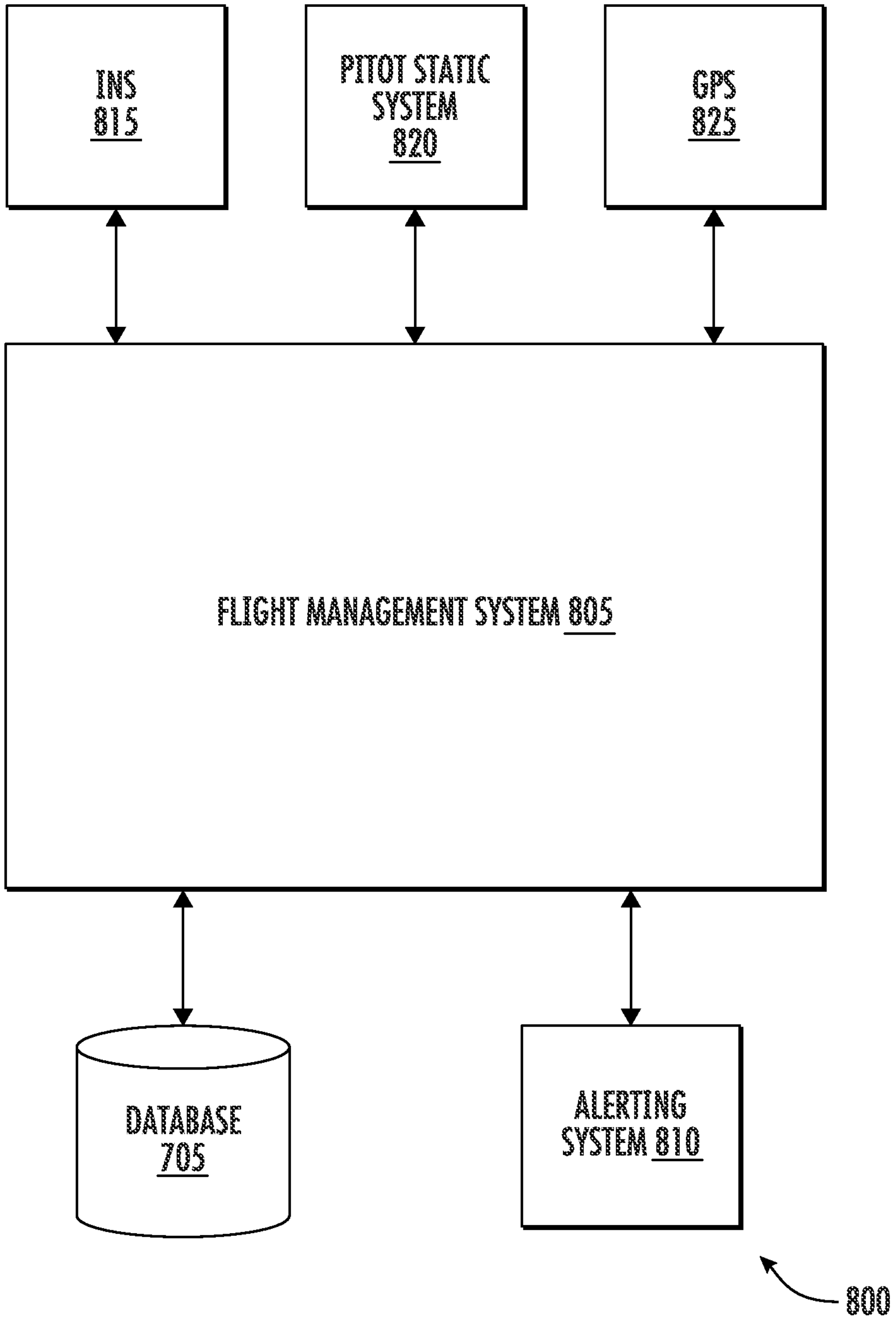
FIG. 8 is an operational example of a system for generating and communicating threat index values in accordance with at least some embodiments of the present disclosure.

FIG. 8 is an operational example of a system 800 for generating and communicating threat index values in accordance with some embodiments discussed herein. As described herein, the components of the system 800 may be embodied by at least one computing entity 200, as described with reference to FIG. 2. For example, the FMS 805, the database 705, the alerting system 810, the inertial navigation system (INS) 815, the pitot static system 820, and the global position system (GPS) 825 may be embodied by at least one computing entity 200. In some examples, the components of the system 800 may be embodied by a single computing entity 200, while in other examples, the components of the system 800 may be embodied by multiple computing entities 200 in communication with one another.

In some examples, the FMS 805 may be an example of the processor 710-*a*, as described with reference to FIG. 7. As described herein, the FMS 805 may receive position and ground speed information for an aircraft from the INS 815, air data computer (e.g., the pitot static system 820), and GPS 825. The FMS 805 may compute a current position for an aircraft and may receive at least one intermediate threat index value from the database 705 (e.g., the AMDB). In some examples, the FMS 805 may generate at least one final threat index value based on the at least one intermediate threat index value received from the database 705. The FMS 805 may then provide information indicative of the at least one final threat index value to the alerting system 810. The alerting system 810 may utilize an algorithm to determine at least one time for providing the information (e.g., via an alert or other information representative of at least one final threat index value) to a user (e.g., a pilot) via a user interface. In some examples, the alerting system 810 may be an example of the processing system 715, as described with reference to FIG. 7. In some examples, a user interface may be an example of a primary flight display (PFD) and may display an airport moving map (AMM). In such examples, intersections may be emphasized graphically using graduated symbols based on final threat index values. Additionally, or alternatively, an aural alert may be provided (e.g., via the alerting system 810), which may assist a pilot in taking appropriate actions based on final threat index values.

Figure 9:
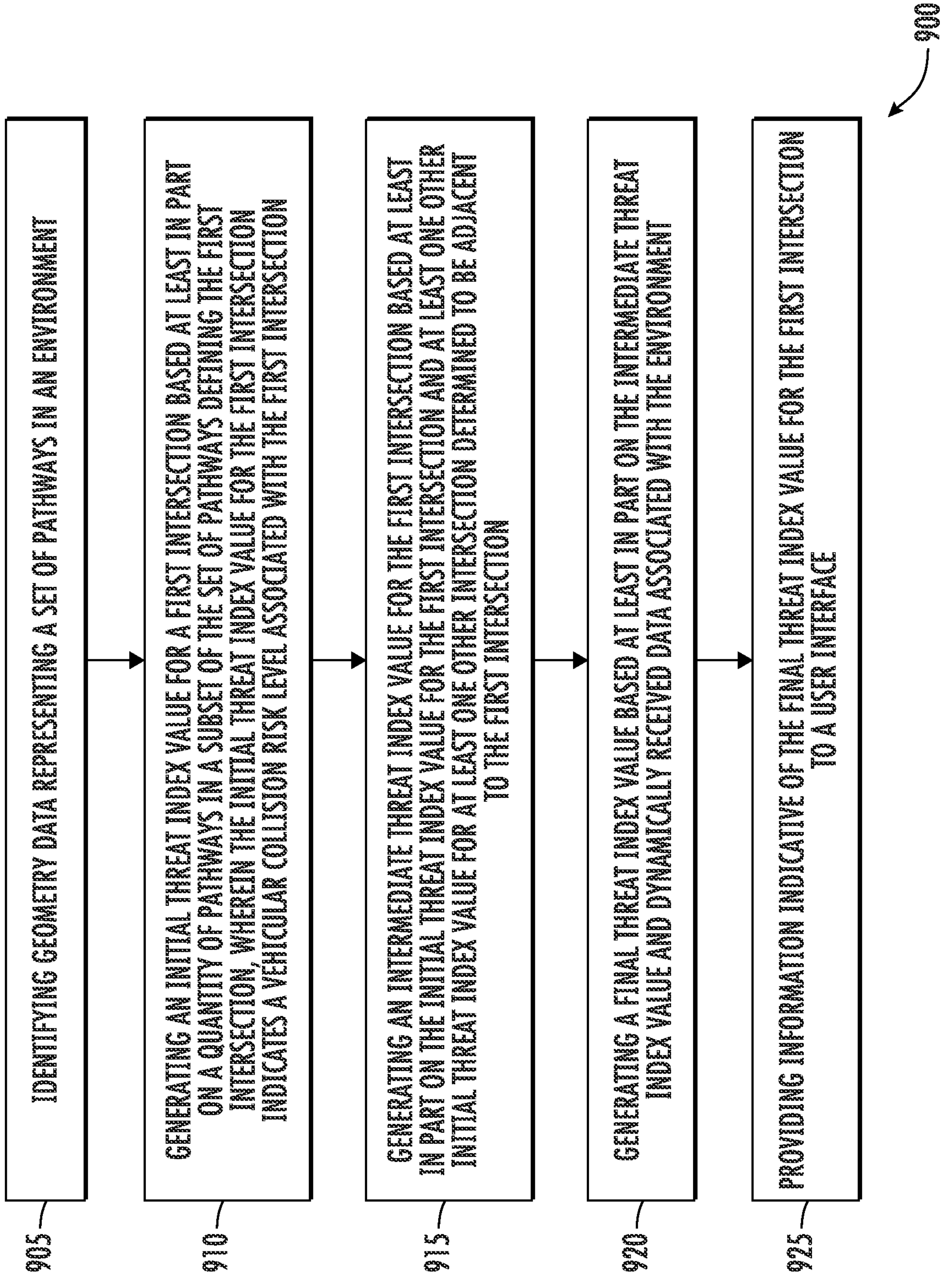
FIG. 9 illustrates a process for generating intersection threat index values in accordance with at least some embodiments of the present disclosure.

FIG. 9 illustrates a process for generating intersection threat index values in accordance with at least some embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Additionally, or alternatively, in some embodiments, the process 900 is performed by at least one specifically configured computing device, such as at least one computing entity 200 alone or in communication with at least one other component, device, system, and/or the like. In this regard, in some such embodiments, the computing entity 200 is specially configured by computer-coded instructions (e.g., computer program instructions) stored thereon, for example in the memory 204 and/or another component depicted and/or described herein and/or otherwise accessible to the computing entity 200, for performing the operations as depicted and described. In some embodiments, the computing entity 200 is in communication with at least one external apparatus, system, device, and/or the like, to perform at least one of the operations as depicted and described. For example, the computing entity 200, in some embodiments, is in communication with an end-user computing device, client device, and/or the like. For purposes of simplifying the description, the process 900 is described as performed by and from the perspective of the computing entity 200.

The process 900 begins at operation 905. At operation 905, the computing entity 200 includes means such as the sensors 210, navigation circuitry 212, flight operations circuitry 214, virtual management circuitry 215, communications circuitry 208, input/output circuitry 206, and/or processor 202, or a combination thereof, to identify geometry data representing a set of pathways in an environment. In some embodiments, the geometry data comprises a polygon representative of the first intersection, the polygon comprising a set of lines representative of the subset of the set of pathways.

At operation 910, the computing entity 200 includes means such as the sensors 210, navigation circuitry 212, flight operations circuitry 214, virtual management circuitry 215, communications circuitry 208, input/output circuitry 206, and/or processor 202, or a combination thereof, to generate an initial threat index value for a first intersection based at least in part on a quantity of pathways in a subset of the set of pathways defining the first intersection. In some embodiments, the initial threat index value for the first intersection indicates a vehicular collision risk level associated with the first intersection. In some embodiments, a first type of trigger event that triggers the generation of the initial threat index value is detected. The first type of trigger event may include a preconfigured trigger event.

At operation 915, the computing entity 200 includes means such as the sensors 210, navigation circuitry 212, flight operations circuitry 214, virtual management circuitry 215, communications circuitry 208, input/output circuitry 206, and/or processor 202, or a combination thereof, to generate an intermediate threat index value for the first intersection based at least in part on the initial threat index value for the first intersection and at least one other initial threat index value for at least one other intersection determined to be adjacent to the first intersection. In some embodiments, the intermediate threat index value is based at least in part on a determination of whether the initial threat index value for the first intersection and the at least one other initial threat index value for the at least one other intersection are different. In some embodiments, the intermediate threat index value is generated by adding a first value to the initial threat index value in a circumstance where the initial threat index value is equal to the at least one other initial threat index value. In some embodiments, the intermediate threat index value is generated by adding a second value to a higher of: (i) the initial threat index value or (ii) the at least one other initial threat index value in a circumstance where the initial threat index value is different from the at least one other initial threat index value. In some embodiments, a first type of trigger event that triggers the generation of the intermediate threat index value is detected. The first type of trigger event may include a preconfigured trigger event.

At operation 920, the computing entity 200 includes means such as the sensors 210, navigation circuitry 212, flight operations circuitry 214, virtual management circuitry 215, communications circuitry 208, input/output circuitry 206, and/or processor 202, or a combination thereof, to generate a final threat index value based at least in part on the intermediate threat index value and dynamically received data associated with the environment. In some embodiments, the dynamically received data comprises at least one of: (i) notice to airmen (NOTAM) data or (ii) traffic information services (TIS) data. In some embodiments, the dynamically received data is associated with at least one vehicle operating within the environment. In some embodiments, a second type of trigger event that triggers the generation of the final threat index value is detected. The second type of trigger event may include a dynamically occurring trigger event.

At operation 925, the computing entity 200 includes means such as the sensors 210, navigation circuitry 212, flight operations circuitry 214, virtual management circuitry 215, communications circuitry 208, input/output circuitry 206, and/or processor 202, or a combination thereof, to provide information indicative of the final threat index value for the first intersection to a user interface. In some embodiments at least one characteristic of a representation for the first intersection, displayed via the user interface, is visually distinguished based at least in part on the final threat index value. In some embodiments, the at least one characteristic comprises at least one of: (i) a color of the representation, (ii) a size of the representation, or (iii) a font of the representation. In some examples, at least one auditory alert may be provided based at least in part on the final threat index value. In some embodiments, the at least one auditory alert may be provided in response to the final threat index value satisfying a threshold threat index value.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In some embodiments, some of the operations above may be modified or further amplified. Furthermore, in some embodiments, additional optional operations may be included. Modifications, amplifications, or additions to the operations above may be performed in any order and in any combination.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated, propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated, propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

identifying geometry data representing a set of pathways in an environment;

generating an initial threat index value for a first intersection based at least in part on a quantity of pathways in a subset of the set of pathways defining the first intersection, wherein the initial threat index value for the first intersection indicates a vehicular collision risk level associated with the first intersection;

generating an intermediate threat index value for the first intersection based at least in part on the initial threat index value for the first intersection and at least one other initial threat index value for at least one other intersection determined to be adjacent to the first intersection;

generating, in real-time, a final threat index value based at least in part on the intermediate threat index value and dynamically received data associated with the environment; and providing, in real-time, information indicative of the final threat index value for the first intersection to a computing device aboard a vehicle to cause the computing device to render a user interface based at least in part on the information.

2. The method of claim 1, wherein at least one characteristic of a representation for the first intersection, displayed via the user interface, is visually distinguished based at least in part on the final threat index value.

3. The method of claim 2, wherein the at least one characteristic comprises at least one of: (i) a color of the representation, (ii) a size of the representation, or (iii) a font of the representation.

4. The method of claim 1, further comprising:

detecting a first type of trigger event that triggers the generation of the initial threat index value and the intermediate threat index value; and detecting a second type of trigger event that triggers the generation of the final threat index value.

5. The method of claim 4, wherein the first type of trigger event comprises a preconfigured trigger event and the second type of trigger event comprises a dynamically occurring trigger event.

6. The method of claim 1, wherein the intermediate threat index value is based at least in part on a determination of whether the initial threat index value for the first intersection and the at least one other initial threat index value for the at least one other intersection are different.

7. The method of claim 1, wherein the intermediate threat index value is generated by adding a first value to the initial threat index value in a circumstance where the initial threat index value is equal to the at least one other initial threat index value.

8. The method of claim 1, wherein the intermediate threat index value is generated by adding a second value to a higher of: (i) the initial threat index value or (ii) the at least one other initial threat index value in a circumstance where the initial threat index value is different from the at least one other initial threat index value.

9. The method of claim 1, further comprising:

providing at least one auditory alert based at least in part on the final threat index value.

10. The method of claim 9, wherein the at least one auditory alert is provided in response to the final threat index value satisfying a threshold threat index value.

11. The method of claim 1, wherein the dynamically received data comprises at least one of: (i) notice to airmen (NOTAM) data or (ii) traffic information services (TIS) data.

12. The method of claim 1, wherein the dynamically received data is associated with at least one vehicle operating within the environment.

13. The method of claim 1, wherein the geometry data comprises a polygon representative of the first intersection, the polygon comprising a set of lines representative of the subset of the set of pathways.

14. A system comprising:

at least one user interface; and at least one processor configured to:

identify geometry data representing a set of pathways in an environment;

generate an initial threat index value for a first intersection based at least in part on a quantity of pathways in a subset of the set of pathways defining the first intersection, wherein the initial threat index value for the first intersection indicates a vehicular collision risk level associated with the first intersection;

generate an intermediate threat index value for the first intersection based at least in part on the initial threat index value for the first intersection and at least one other initial threat index value for at least one other intersection determined to be adjacent to the first intersection;

generate, in real-time, a final threat index value based at least in part on the intermediate threat index value and dynamically received data associated with the environment; and provide, in real-time, information indicative of the final threat index value for the first intersection to a computing device aboard a vehicle to cause the computing device to render the user interface based at least in part on the information.

15. The system of claim 14, wherein at least one characteristic of a representation for the first intersection, displayed via the user interface, is visually distinguished based at least in part on the final threat index value.

16. The system of claim 15, wherein the at least one characteristic comprises at least one of: (i) a color of the representation, (ii) a size of the representation, or (iii) a font of the representation.

17. The system of claim 14, wherein the at least one processor is further configured to:

detect a first type of trigger event that triggers the generation of the initial threat index value and the intermediate threat index value; and detect a second type of trigger event that triggers the generation of the final threat index value.

18. The system of claim 17, wherein the first type of trigger event comprises a preconfigured trigger event and the second type of trigger event comprises a dynamically occurring trigger event.

19. The system of claim 14, wherein the intermediate threat index value is based at least in part on a determination of whether the initial threat index value for the first intersection and the at least one other initial threat index value for the at least one other intersection are different.

20. An apparatus comprising:
at least one processor; and
at least one memory storing instructions that, when executed by the at least one processor, cause the apparatus to:
identify geometry data representing a set of pathways in an environment;
generate an initial threat index value for a first intersection based at least in part on a quantity of pathways in a subset of the set of pathways defining the first intersection, wherein the initial threat index value for the first intersection indicates a vehicular collision risk level associated with the first intersection;
generate an intermediate threat index value for the first intersection based at least in part on the initial threat index value for the first intersection and at least one other initial threat index value for at least one other intersection determined to be adjacent to the first intersection;
generate, in real-time, a final threat index value based at least in part on the intermediate threat index value and dynamically received data associated with the environment; and
provide, in real-time, information indicative of the final threat index value for the first intersection to a computing device aboard a vehicle to cause the computing device to render a user interface based at least in part on the information.

* * * * *